(12) United States Patent
Liu et al.

(10) Patent No.: US 10,270,632 B2
(45) Date of Patent: Apr. 23, 2019

(54) MODULATOR, MODULATION SYSTEM, AND METHOD FOR IMPLEMENTING HIGHER ORDER MODULATION

(71) Applicant: Huawei Technologies Co., Ltd., Shenzhen, Guangdong (CN)

(72) Inventors: Lei Liu, Chengdu (CN); Yuanyuan Fang, Shenzhen (CN); Shupeng Deng, Shenzhen (CN); Chi Yan Wong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/974,489

(22) Filed: May 8, 2018

(65) Prior Publication Data

US 2018/0262376 A1 Sep. 13, 2018

Related U.S. Application Data

(63) Continuation of application No. PCT/CN2015/094119, filed on Nov. 9, 2015.

(51) Int. Cl.
*H04B 10/50* (2013.01)
*H04L 27/20* (2006.01)
(Continued)

(52) U.S. Cl.
CPC ........... *H04L 27/2096* (2013.01); *G02F 1/00* (2013.01); *H04B 10/25* (2013.01);
(Continued)

(58) Field of Classification Search
CPC ... H04J 14/02; H04B 10/5053; H04B 10/532; G02F 2001/212
See application file for complete search history.

(56) References Cited

U.S. PATENT DOCUMENTS

2005/0174577 A1* 8/2005 Szafraniec ........... G01M 11/331
356/477
2005/0220161 A1* 10/2005 Bolshtyansky ....... H01S 3/0941
372/69
(Continued)

FOREIGN PATENT DOCUMENTS

CN 102185814 A 9/2011
CN 102255662 A 11/2011
(Continued)

*Primary Examiner* — Kevin Kim

(57) ABSTRACT

Embodiments of the present disclosure disclose a modulator, including: a first modulation module, configured to: receive first to-be-modulated data, and output a first transmission curve according to the first to-be-modulated data; a second modulation module, configured to: receive second to-be-modulated data, and output a second transmission curve according to the second to-be-modulated data, where a period of the second transmission curve is half of a period of the first transmission curve; and a combination module, configured to perform phase superposition on the first transmission curve and the second transmission curve, to obtain a combined linear result. In addition, this solution further provides a modulation system and a method for implementing higher order modulation, so that a linear result that can be modulated can be obtained by controlling a superposition ratio between transmission curves, to implement linear curve transmission.

12 Claims, 15 Drawing Sheets

(51) Int. Cl.
*G02F 1/00* (2006.01)
*H04B 10/588* (2013.01)
*H04B 10/25* (2013.01)
*H04L 27/00* (2006.01)
*H04L 27/26* (2006.01)
*G02F 1/225* (2006.01)

(52) U.S. Cl.
CPC ....... *H04B 10/5053* (2013.01); *H04B 10/588* (2013.01); *H04L 27/0008* (2013.01); *H04L 27/20* (2013.01); *H04L 27/26* (2013.01); *G02F 1/225* (2013.01)

(56) References Cited

U.S. PATENT DOCUMENTS

| | | | | |
|---|---|---|---|---|
| 2011/0176815 | A1* | 7/2011 | Frankel | H04B 10/5053 398/184 |
| 2012/0301153 | A1* | 11/2012 | Takeguchi | H04B 10/5053 398/135 |
| 2013/0011093 | A1* | 1/2013 | Goh | G02F 1/0121 385/3 |
| 2014/0072313 | A1 | 3/2014 | Yamazaki | |
| 2015/0277156 | A1 | 10/2015 | Kondou | |

FOREIGN PATENT DOCUMENTS

| | | |
|---|---|---|
| EP | 0674210 A2 | 9/1995 |
| JP | 2012058696 A | 3/2012 |

\* cited by examiner

MODULATOR, MODULATION SYSTEM, AND METHOD FOR IMPLEMENTING HIGHER ORDER MODULATION

CROSS-REFERENCE TO RELATED APPLICATIONS

This application is a continuation of International Application No. PCT/CN2015/094119, filed on Nov. 9, 2015, which is hereby incorporated by reference in its entirety.

TECHNICAL FIELD

The present application relates to signal modulation in the communications field, and in particular, to a modulator, a modulation system, and a method for implementing higher order modulation.

BACKGROUND

With rapid development of data communication and the Internet, a network point-to-point application, an online application, and a video service are increasing exponentially. Massive digital media content promotes a dramatic tenfold or hundredfold increase in Internet traffic. Currently, a system whose transmission rate is 100000 megabits per second (that is, 100 Gbps) is commercially used by operators. A 400 G system can further improve a network capacity and reduce transmission costs per bit on a basis of 100 G, so as to effectively relieve pressure of continuously increasing service traffic and network bandwidth on operators.

In a 100 G system, a quadrature phase shift keying (QPSK) modulation technology, a coherent detection technology, and a digital signal processing (DSP) technology are used to reduce an optical signal-to-noise ratio (OSNR) capacity of the system to an order of magnitude of 10 G, so that a requirement of the system for an optical fiber is lowered.

Problems such as OSNR limitation, noise, and nonlinearity in the 400 G system limit a transmission distance. Currently, a transmission distance of the 400 G system in which a mainstream device uses dual carriers and a quadrature amplitude modulation (16 QAM) technology is about only one third of that of the 100 G system. Therefore, requirements for a system capacity and a transmission distance need to be comprehensively considered for high-rate system construction.

In the prior art, QPSK and polarization division multiplexing-quadrature phase shift keying (PDM-QPSK) are implemented based on a lithium niobate (LiNbO$_3$) device. Referring to FIG. 1, FIG. 1 is a schematic architecture diagram in which QPSK and PDM-QPSK are implemented in the prior art. A sinusoidal modulation curve may be obtained by using this modulation architecture.

However, because the modulation curve is a sinusoidal curve, during higher order modulation such as 16 QAM, a digital to analog converter (DAC) is required to perform non-linear compensation. Consequently, compensation power consumption and a chip scale of a digital signal processor (DSP) are increased, and in particular, more compensation power consumption and a larger chip scale are required during higher order modulation.

SUMMARY

Embodiments of the present disclosure provide a modulator, a modulation system, and a method for implementing higher order modulation, so that a linear result that can be modulated can be obtained by controlling a superposition ratio between transmission curves, to implement linear curve transmission. The embodiments are applicable to a plurality of modulation scenarios, to enhance solution flexibility.

A first aspect of the embodiments of the present disclosure provides a modulator, including:

a first modulation module, configured to: receive first to-be-modulated data, and output a first transmission curve according to the first to-be-modulated data;

a second modulation module, configured to: receive second to-be-modulated data, and output a second transmission curve according to the second to-be-modulated data, where a period of the second transmission curve is half of a period of the first transmission curve; and a combination module, configured to perform phase superposition on the first transmission curve and the second transmission curve, to obtain a combined linear result.

With reference to the first aspect of the embodiments of the present disclosure, in a first possible implementation, the modulator further includes an asymmetric coupling module;

the asymmetric coupling module is configured to add a preset phase shift value to the first transmission curve, to obtain a shifted first transmission curve; and the combination module is further configured to perform phase superposition on the shifted first transmission curve and the second transmission curve, to obtain a combined linear result.

With reference to the first aspect of the embodiments of the present disclosure, in a second possible implementation, the modulator further includes a first phase shifting module and a first attenuation module;

the first phase shifting module is configured to: adjust phases of the first transmission curve and the second transmission curve, to obtain an adjusted first transmission curve and an adjusted second transmission curve, so that the combination module performs phase superposition on the adjusted first transmission curve and the adjusted second transmission curve, to obtain a combined linear result; and the first attenuation module is configured to: control a curve ratio of the adjusted first transmission curve to the adjusted second transmission curve, pre-compensate the linear result according to the curve ratio, and output a pre-compensated linear result.

With reference to the first aspect of the embodiments of the present disclosure, in a third possible implementation, the modulator further includes a third modulation module, a second phase shifting module, and a second attenuation module;

the third modulation module is configured to: receive third to-be-modulated data, and output a third transmission curve according to the third to-be-modulated data, where a period of the third transmission curve is half of the period of the second transmission curve;

the second phase shifting module is configured to: adjust phases of the first transmission curve, the second transmission curve, and the third transmission curve, to obtain the adjusted first transmission curve, the adjusted second transmission curve, and an adjusted third transmission curve, so that the combination module performs phase superposition on the adjusted first transmission curve, the adjusted second transmission curve, and the adjusted third transmission curve, to obtain a combined linear result; and the second attenuation module is configured to: control a curve ratio of the adjusted first transmission curve, the adjusted second transmission curve, and the adjusted third transmission curve, pre-compensate the linear result according to the curve ratio, and output a pre-compensated linear result.

With reference to the second possible implementation of the first aspect of the embodiments of the present disclosure, in a fourth possible implementation, the first modulation module is connected to the first phase shifting module, and the first phase shifting module is connected to the first attenuation module by using the second modulation module.

A second aspect of the embodiments of the present disclosure provides a system for implementing higher order modulation, and the system includes at least one modulator; and the modulator is the modulator according to any one of the first aspect of the present disclosure, or the first to the fourth possible implementations of the first aspect.

A third aspect of the embodiments of present disclosure provides a method for implementing higher order modulation, including:

receiving first to-be-modulated data, and outputting a first transmission curve according to the first to-be-modulated data;

receiving second to-be-modulated data, and outputting a second transmission curve according to the second to-be-modulated data, where a period of the second transmission curve is half of a period of the first transmission curve; and performing phase superposition on the first transmission curve and the second transmission curve, to obtain a combined linear result.

With reference to the third aspect of the embodiments of the present disclosure, in a first possible implementation, before the performing phase superposition on the first transmission curve and the second transmission curve, the method further includes:

adding a preset phase shift value to the first transmission curve, to obtain a shifted first transmission curve, and performing phase superposition on the shifted first transmission curve and the second transmission curve.

With reference to the third aspect of the embodiments of the present disclosure, in a second possible implementation, before the performing phase superposition on the first transmission curve and the second transmission curve, the method further includes:

adjusting phases of the first transmission curve and the second transmission curve, to obtain an adjusted first transmission curve and an adjusted second transmission curve, so that phase superposition is performed on the adjusted first transmission curve and the adjusted second transmission curve; and controlling a curve ratio of the adjusted first transmission curve to the adjusted second transmission curve, pre-compensating the linear result according to the curve ratio, and outputting a pre-compensated linear result.

With reference to the third aspect of the embodiments of the present disclosure, in a third possible implementation, after the receiving second to-be-modulated data, and outputting a second transmission curve according to the second to-be-modulated data, the method further includes:

receiving third to-be-modulated data, and outputting a third transmission curve according to the third to-be-modulated data, where a period of the third transmission curve is half of the period of the second transmission curve;

adjusting phases of the first transmission curve, the second transmission curve, and the third transmission curve, to obtain the adjusted first transmission curve, the adjusted second transmission curve, and an adjusted third transmission curve, so that phase superposition is performed on the adjusted first transmission curve, the adjusted second transmission curve, and the adjusted third transmission curve; and controlling a curve ratio of the adjusted first transmission curve to the adjusted second transmission curve to the adjusted third transmission curve, pre-compensating the linear result according to the curve ratio, and outputting a pre-compensated linear result.

With reference to the second possible implementation of the third aspect of the embodiments of the present disclosure, in a fourth possible implementation, after the receiving first to-be-modulated data, and outputting a first transmission curve according to the first to-be-modulated data, the method further includes:

adjusting a phase of the first transmission curve; and after the receiving second to-be-modulated data, and outputting a second transmission curve according to the second to-be-modulated data, the method further includes:

controlling a curve ratio of the adjusted first transmission curve to the second transmission curve.

It may be learned from the foregoing technical solutions that the embodiments of the present disclosure have the following advantages:

In the embodiments of the present disclosure, the modulator for implementing higher order modulation is provided. The modulator may modulate the received first to-be-modulated data and the received second to-be-modulated data, and output the corresponding first transmission curve and the corresponding second transmission curve. Periods of the second transmission curve and the first transmission curve are in a multiple relationship, and phase superposition is performed on the two transmission curves, to obtain a required linear result. The modulator performs phase superposition on the first transmission curve and the second transmission curve, to implement linear curve transmission. The embodiments are applicable to a plurality of modulation scenarios, to enhance solution flexibility. In addition, in the foregoing process, when higher order modulation does not need to be performed, a digital to analog converter may be additionally used to complete non-linear compensation, so that compensation power consumption and a chip scale of a digital signal processor can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may still derive other drawings from these accompanying drawings without creative efforts.

DESCRIPTION OF EMBODIMENTS

Figure 1:
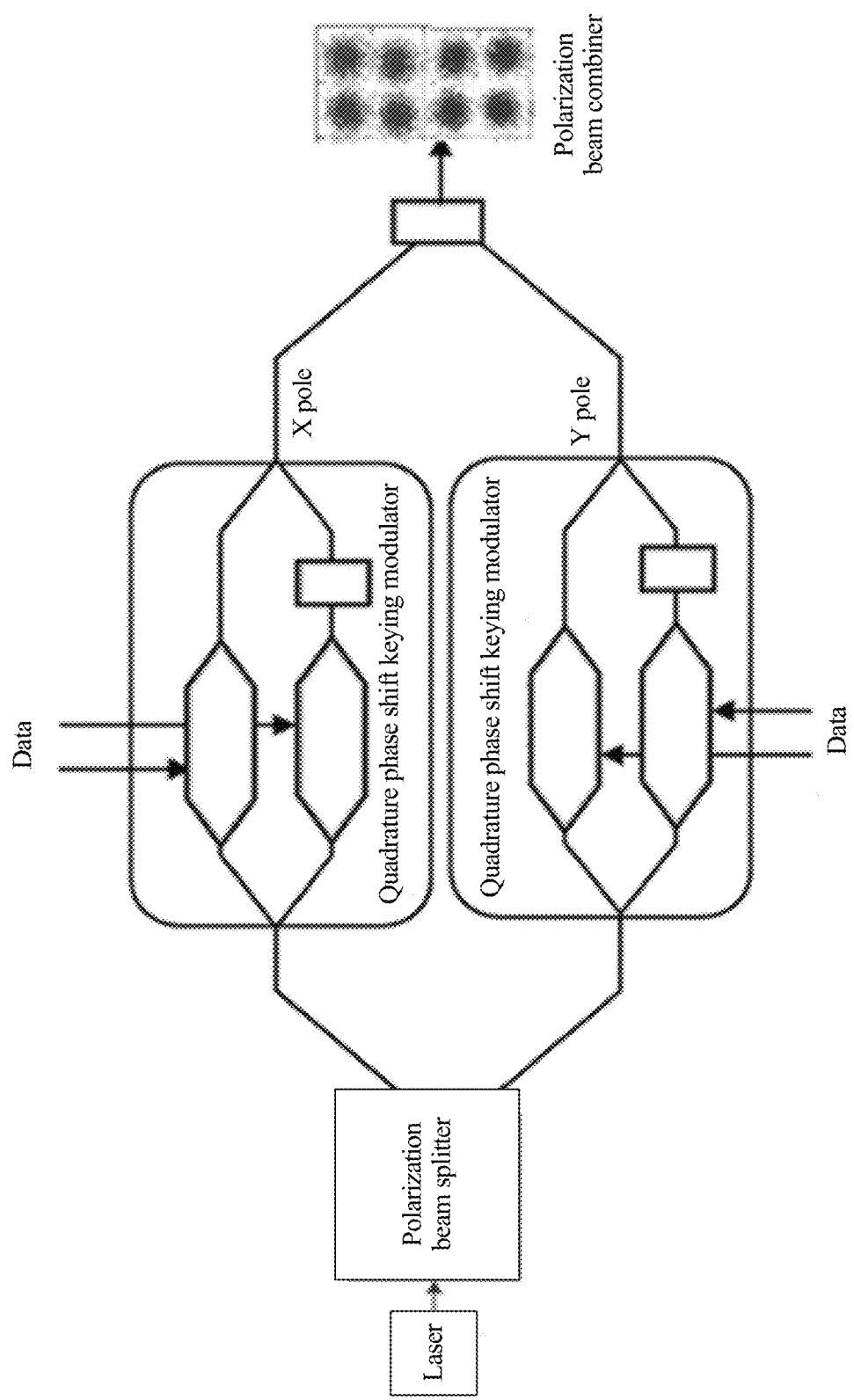
FIG. 1 is a schematic architecture diagram in which QPSK and PDM-QPSK are implemented in the prior art.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of the present disclosure provide a modulator, a modulation system, and a method for implementing higher order modulation, so that a linear result that can be modulated can be obtained by controlling a superposition ratio between transmission curves, to implement linear curve transmission. The embodiments are applicable to a plurality of modulation scenarios, to enhance solution flexibility. For details, refer to FIG. 1 to FIG. 15. The following separately gives detailed descriptions with reference to specific embodiments.

It should be understood that the modulator provided in the embodiments of the present disclosure may be applied to a high-speed optical transmission technology such as a mobile Internet, cloud computing, and the Internet. With rapid development of communications services, a network imposes a requirement on high bandwidth scheduling. In the embodiments, a 100 Gb/s high-speed optical transmission system is used as an example for description. However, in actual application, a system is not limited to the 100 Gb/s high-speed optical transmission system, or may be another system such as a 400 Gb/s high-speed optical transmission system.

A core network router interconnection is a vital driving force of 40 Gb/s, and promotes development of a modulation code pattern technology of a 40 Gb/s dense wavelength division multiplexing (DWDM) transmission system in a backbone network. 40 Gb/s can better meet a requirement of increasing Internet Protocol (IP) broadband service traffic, is highly-integrated, and has advantages of reducing space, electricity consumption, and operation maintenance costs. However, in comparison with 10 Gb/s transmission in a same IoT condition, for a 40 bit/s DWDM transmission system, an optical signal-to-noise ratio (OSNR) is degraded fourfold, a chromatic dispersion capacity is reduced sixteenfold, polarization mode dispersion (PMD) is degraded fourfold, and a non-linear effect is more obvious. Therefore, to improve transmission performance, and reduce limitation in aspects such as an OSNR, PMD, non-linearity, and dispersion, application of an advanced modulation code pattern becomes one of key transmission technologies. The following describes three mainstream modulation code patterns.

1. Differential Phase Shift Keying (DPSK)

A modulation format widely used in a fiber optic transmission system is amplitude-based on-off keying (OOK) modulation, and reception is performed through direct detection. A prechirp technique is introduced on a basis of phase-based DPSK modulation and conventional QPSK to improve a non-linear capacity. The prechirp technique is used to cancel chirp generated by a pulse in transmission and propagation processes, to compress the pulse, thereby extending a transmission distance and improving transmission performance.

2. Differential Quadrature Phase Shift Keying (DQPSK)

A DQPSK modulation code pattern includes delay differential reception and coherent reception. Performance of differential reception is worse than that of coherent reception. The coherent reception uses a QPSK modulation code pattern, and the QPSK modulation code pattern uses four different phases of a carrier to represent digital information. Because each carrier phase represents two-bit information, each quaternary code element is referred to as a dibit code element. A current information bit included in a dibit code element is represented by a, and a next information bit is represented by b. Two information bits a and b in the dibit code element are arranged according to a Gray code, that is, a reflected code. A correspondence between a dibit code element and a carrier phase is shown in the following Table:

TABLE 1

| Dibit code element | | Carrier phase $\varphi$ | |
| --- | --- | --- | --- |
| a | b | Manner A | Manner B |
| 0 | 0 | 0° | 45° |
| 0 | 1 | 90° | 135° |

TABLE 1-continued

| Dibit code element | | Carrier phase φ | |
| --- | --- | --- | --- |
| a | b | Manner A | Manner B |
| 1 | 1 | 180° | 225° |
| 1 | 0 | 270° | 315° |

Because quadrature phase shift keying may be a combination of two quadrature binary phase shift keying, the two have a same power spectrum density distribution rule.

3. Dual-Polarization Differential Quadrature Phase Shift Keying (English Full Name: Double Polarization Quadrature Reference Phase Shift Keying, DP-QPSK for Short)

In the DP-QPSK, two paths of different information are transmitted by using a polarization multiplexing DQPSK modulation code pattern, or dual-polarized QPSK, that is, two quadrature polarization states. Although frequencies of the two quadrature polarization states are the same, there is a 90° polarity difference. Therefore, the polarization states are not affected by each other, and spectral efficiency is improved by one fold in comparison with that of DQPSK, that is, four bits are transmitted on one symbol, so that a noise characteristic similar to that of a conventional 10 Gb/s non-return-to-zero on-off keying (NRZ-OOK) transmission system can be obtained. Through polarization multiplexing and differential quadrature phase shift keying, a line rate is decreased to 10 G bauds, a bandwidth requirement of electronic and electro-optic devices is greatly lowered, so that digital signal processing is implemented, and large-scale chromatic dispersion and PMD compensation are implemented in an electric domain. Polarization diversity and digital coherent reception technologies are used for a DP-QPSK modulation code pattern signal, so that a signal light is split into two quadrature polarization signals when passing through a polarization beam splitter (PBS). Frequencies of each quadrature polarization signal and a local optical source are mixed, and carrier frequency control precision of the local optical source is several hundreds of kilohertz (kHz). After the frequencies are mixed, four polarized optical signals with quadrature phases are obtained, and are separately received through balanced detection. After electricity amplification and filtering, the optical signals are converted into four digital signals by using a conversion circuit of an analog to digital converter (A/D), so that integrated processing such as polarization splitting, phase distortion elimination, dispersion, polarization mode dispersion, or compensation and balance of a non-linear effect is implemented in an electric domain.

In the embodiments of the present disclosure, a modulator is designed mainly for compensation of a non-linear effect. A linear result that can be modulated can be obtained by controlling a superposition ratio between transmission curves, to implement linear curve transmission. It should be understood that in a new modulator structure provided in the solutions of the present disclosure, transmission curves are combined by cascading Mach-Zehnder modulator (MZM) devices. Half-wave voltages $V_{pi}$ of MZM devices are in a multiple relationship, and a cascading manner may be a parallel connection or a serial connection. Signals are combined by using different optical field strength ratios, and a curve combination shape is controlled by controlling a split ratio between the MZM devices, so that a transmission curve can be adjusted.

Figure 2:
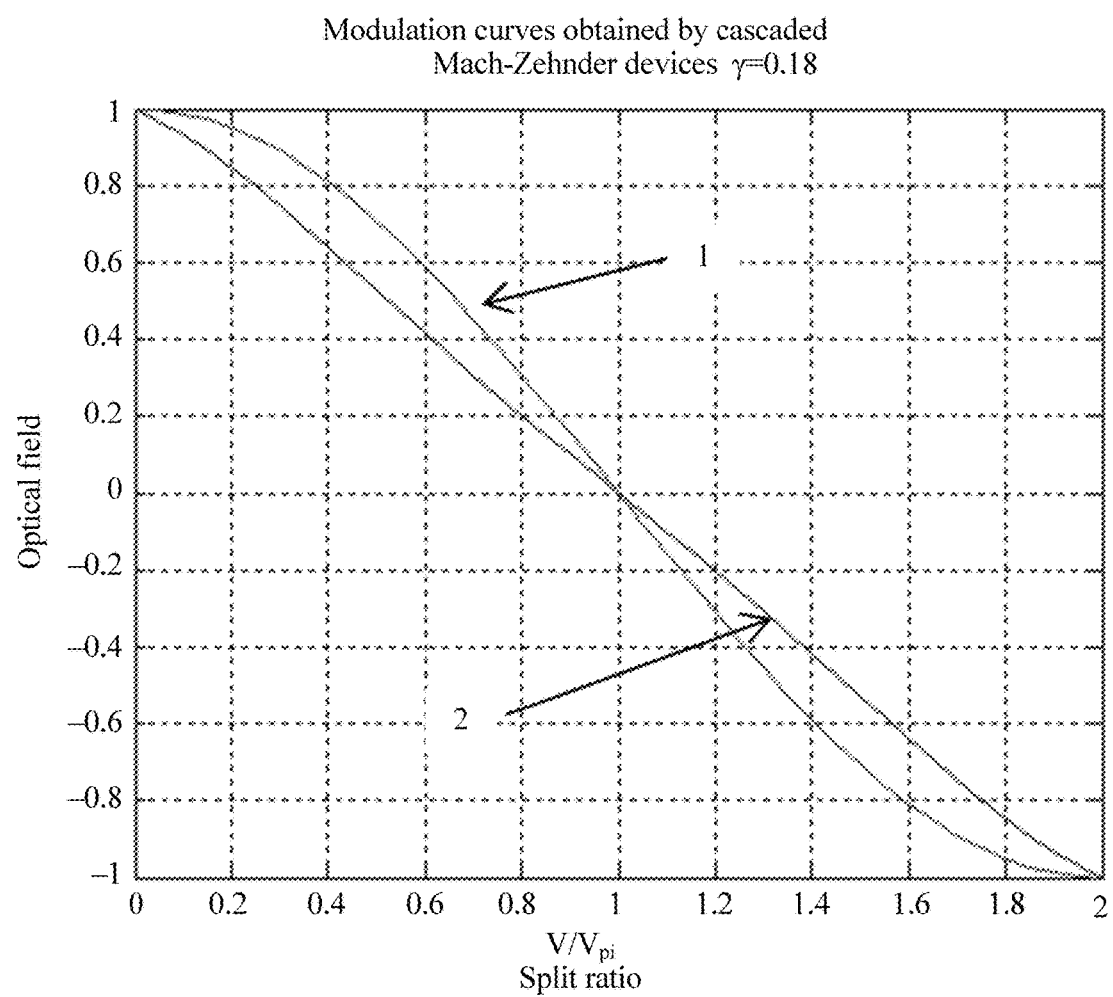
FIG. 2 is a schematic diagram of a transmission curve according to an embodiment of the present disclosure.

Compared with a curve modulated by a conventional modulator, a transmission curve obtained in the solutions of the present disclosure is more linear, that is, a linear effect is more obvious. Referring to FIG. 2, FIG. 2 is a schematic diagram of a transmission curve according to an embodiment of the present disclosure. As shown in the diagram, a corresponding output curve is obtained when MZM devices are cascaded. It is assumed that a normalized field strength factor γ=0.18. A curve 1 in the diagram is a transmission curve modulated by a conventional modulator, the transmission curve is sinusoidal, and an optical field is decreased as a split ratio decreases. A curve 2 is a transmission curve obtained through modulation in this embodiment of the present disclosure. Compared with the curve 1, the curve 2 is more linear, and an optical field is also decreased as a split ratio decreases.

Figure 3:
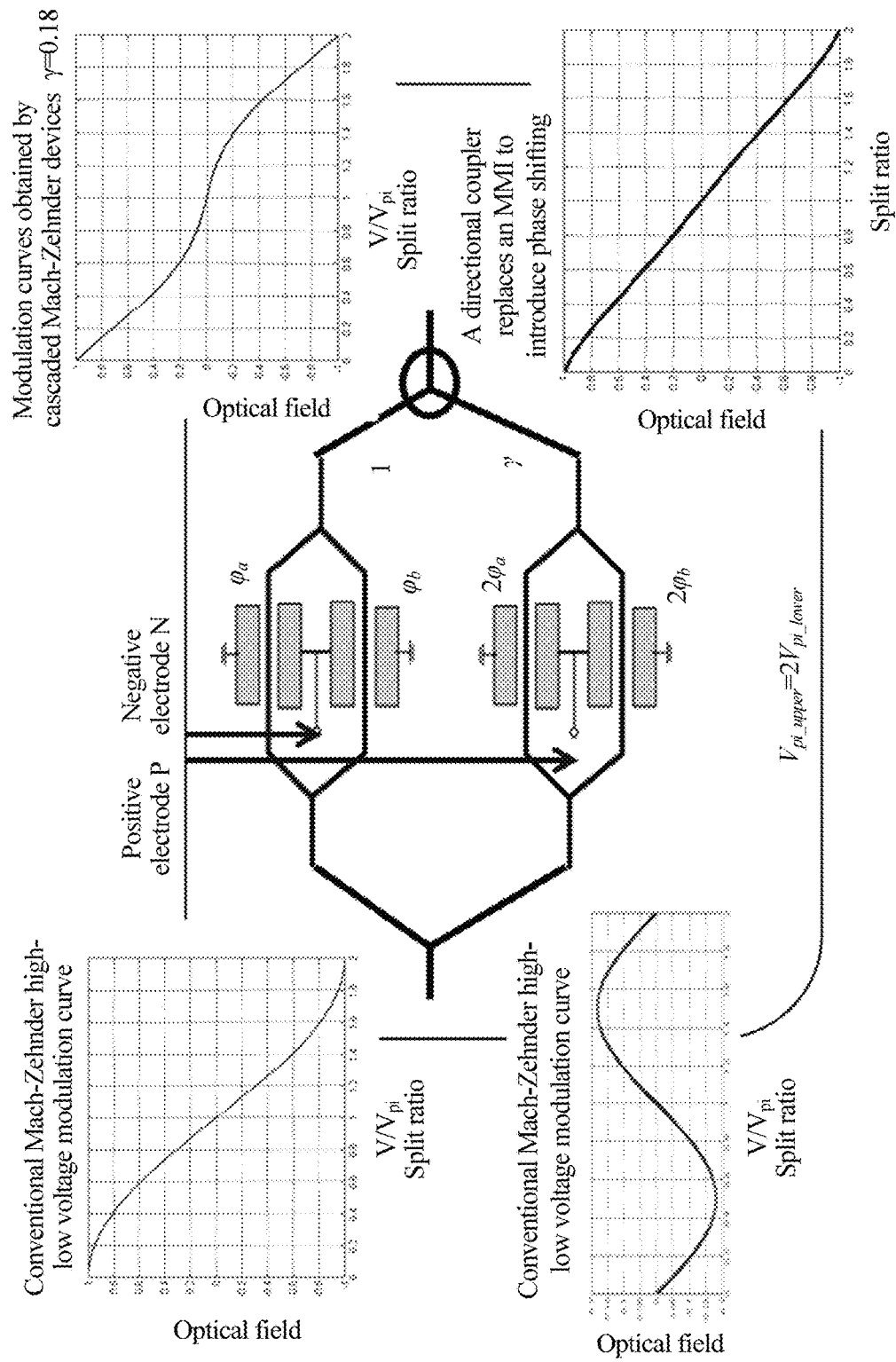
FIG. 3 is a schematic structural diagram of a modulator in theoretical simulation according to an embodiment of the present disclosure.

In this embodiment, the curve 2 corresponding to FIG. 2 may be obtained by using a theoretical simulation method. Specifically, referring to FIG. 3, FIG. 3 is a schematic structural diagram of a modulator in theoretical simulation according to an embodiment of the present disclosure. In the diagram, P is a positive voltage, N is a negative voltage, and the positive voltage is twice as much as the negative voltage, that is, $V_{pi\_upper}=2V_{pi\_lower}$, and $V_{pi}$ is a half-wave voltage. The half-wave voltage is a voltage that needs to be added when an optical wave is propagated in an optic crystal, where an optical path difference between two vertical components Ex' and Ey' of the optical wave is a half wave length (that is, a corresponding phase difference is 180 degrees). In FIG. 3, a method for replacing a mode-locked laser (MLL) by a directional coupler to introduce phase shifting is described. In actual application, a phase shifting unit may be introduced at an output end of the positive voltage to output a modulation curve. In FIG. 3, only curves output after two MZM devices are cascaded are combined. However, this embodiment of the present disclosure is not limited to cascading of two MZM devices. Therefore, an output modulation curve may be generated by superposing a plurality of curves. The following describes how to output a combined modulation curve.

A formula $$\psi(t) = \psi_0 \exp\left[j\left(\omega_0 t + \frac{\phi_a + \phi_b}{2}\right)\right] \cos\frac{\phi_a - \phi_b}{2}$$

is used, where $\psi(t)$ is a function between a curve and a time, $\psi_0$ is an optical field initial value obtained when a voltage is 0, j is an imaginary unit, $\omega_0 t$ is an angle initial value obtained when a voltage is 0, $\phi_a$ is a shifting angle in a voltage $V_{pi\_upper}$, $\phi_b$ is a shifting angle in a voltage $V_{pi\_lower}$, and $V_{pi\_upper}=2V_{pi\_lower}$.

Shifting angles corresponding to positive and negative voltages are separately substituted into the formula, to obtain a function between a curve and a time in the negative voltage:

$\psi(t)=\psi_0\exp(j\omega_0 t)\cos(\Delta\phi/2)$, and a function between a curve and a time in the positive voltage:

$\psi(t)=\psi_0\exp(j\omega_0 t)\sin(-2\cdot\Delta\phi/2)$, where $-2\cdot\Delta\phi$ is a corresponding angle difference obtained when $V_{pi\_upper}=2V_{pi\_lower}$, and specifically, the angle difference may be $\cos(-2\cdot\Delta\phi/2-90°)=-\sin(2\cdot\Delta\phi/2)$.

It is assumed that a voltage coefficient of the negative voltage is 1, a voltage coefficient of the positive voltage is γ, 1 is substituted into the foregoing function $\psi(t)=\psi_0\exp$ $(j\omega_0 t)\cos(\Delta\phi/2)$, and the voltage coefficient $\gamma$ of the positive voltage is substituted into the foregoing function $\psi(t)=\psi_0\exp(j\omega_0 t)\sin(-2\cdot\Delta\phi/2)$, to obtain a combined modulation curve function: $\psi(t)=\psi_0\exp(j\omega_0 t)[\cos(\Delta\phi/2)-\gamma\sin(2\cdot\Delta\phi/2)]$.

Figure 4A:
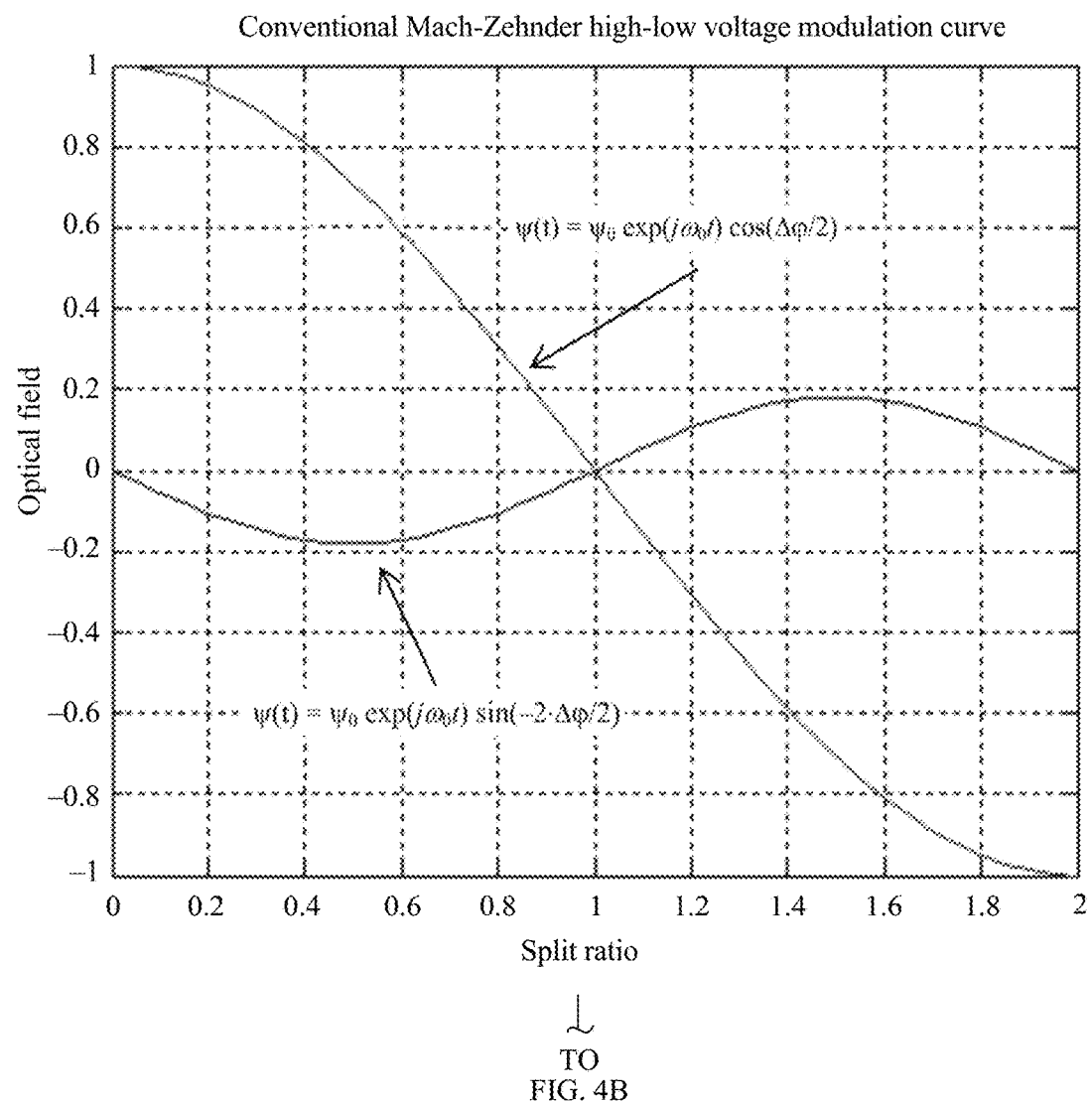
FIG. 4A and FIG. 4B are a schematic diagram of a comparison between a modulation curve output by a modulator in an embodiment of the present disclosure and a modulation curve output by a conventional modulator.
Figure 4B:
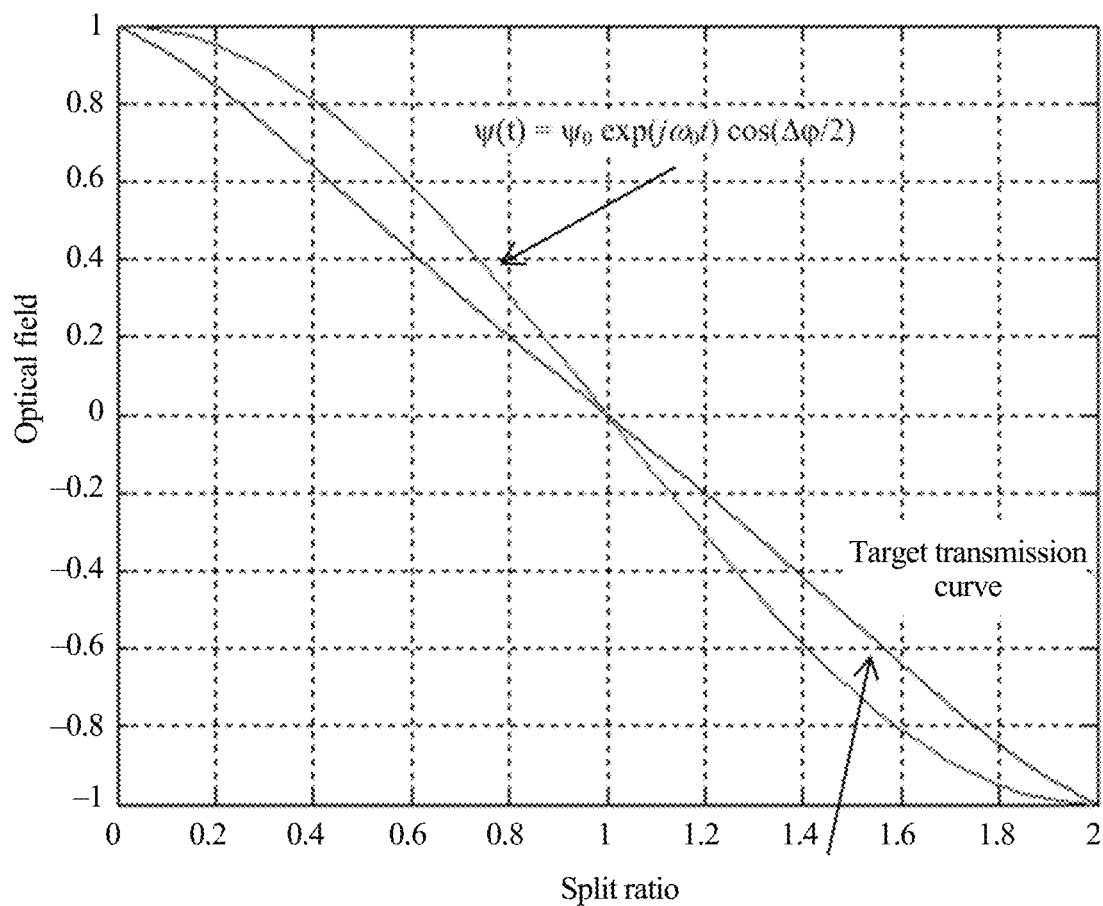

Referring to FIG. 4A and FIG. 4B, FIG. 4A and FIG. 4B are a schematic diagram of a comparison between a modulation curve output by a modulator in an embodiment of the present disclosure and a modulation curve output by a conventional modulator. Before a modulation curve is obtained, a function of a conventional MZM high-voltage modulation curve may be represented as $t\psi(t)=\psi_0\exp(j\omega_0 t)\sin(-2\cdot\Delta\phi/2)$, and a function of a conventional MZM low-voltage modulation curve may be represented as $\psi(t)=\psi_0\exp(j\omega_0 t)\cos(\Delta\phi/2)$. A modulation curve $\psi(t)=\psi_0\exp(j\omega_0 t)\cos(\Delta\phi/2)$ generated before combination is obtained by cascading MZM devices. The conventional MZM high voltage modulation curve is combined with the conventional MZM low voltage modulation curve, to obtain a modulation curve $\psi(t)=\psi_0\exp(j\omega_0 t)[\cos(\Delta\phi/2)-\gamma\sin(2\cdot\Delta\phi/2)]$.

According to a modulation curve comparison diagram in FIG. 4A and FIG. 4B, it can be learned that a modulation curve obtained in conventional MZM high and low voltages is sinusoidal. However, when cascaded MZM devices used in this solution of the present disclosure are used, modulation curves obtained by a conventional MZM device may be superposed, so that a required modulation curve is obtained by combination, and is more linear.

Figure 5:
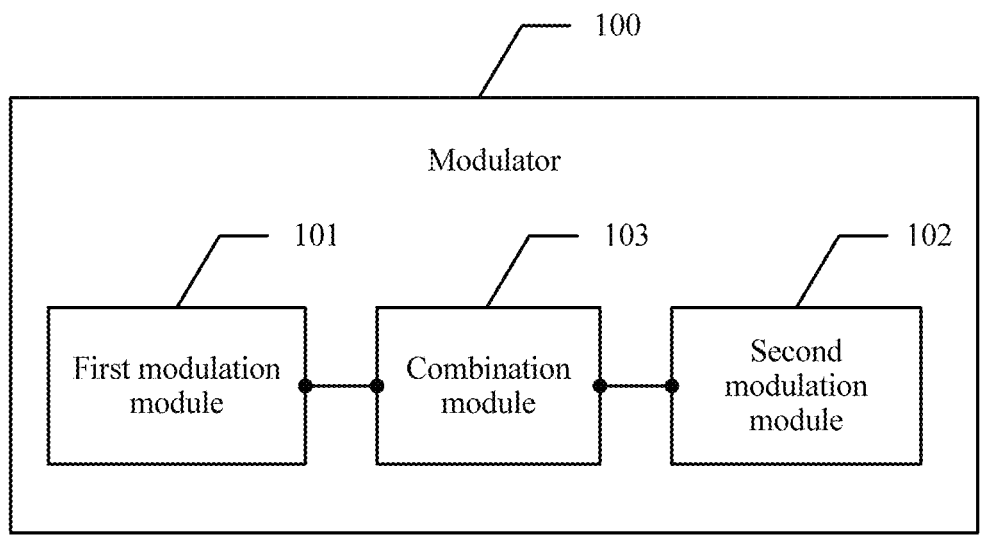
FIG. 5 is a schematic diagram of an embodiment of a modulator for implementing higher order modulation according to an embodiment of the present disclosure.

An embodiment of the present disclosure specifically describes how to output a more linear modulation curve. Referring to FIG. 5, FIG. 5 is a schematic diagram of an embodiment of a modulator for implementing higher order modulation according to an embodiment of the present disclosure. A modulator 100 for implementing higher order modulation includes:

a first modulation module 101, configured to: receive first to-be-modulated data, and output a first transmission curve according to the first to-be-modulated data;

a second modulation module 102, configured to: receive second to-be-modulated data, and output a second transmission curve according to the second to-be-modulated data, where a period of the second transmission curve is half of a period of the first transmission curve; and a combination module 103, configured to perform phase superposition on the first transmission curve received by the first modulation module 101 and the second transmission curve received by the second modulation module 102, to obtain a combined linear result.

In this embodiment, the modulator for implementing higher order modulation includes three modules: the first modulation module, the second modulation module, and the combination module. Under control of a positive voltage, the first modulation module receives the first to-be-modulated data, and outputs the first to-be-modulated data, to obtain the corresponding first transmission curve, and the first transmission curve is sinusoidal. Under control of a negative voltage, the second modulation module receives the second to-be-modulated data, and outputs the second to-be-modulated data, to obtain the corresponding second transmission curve. Similarly, the second transmission curve is sinusoidal. However, because there is a voltage difference between the positive voltage and the negative voltage, and the negative voltage is half of the positive voltage, the period of the obtained second transmission curve is half of the period of the first transmission curve. The combination module combines the first transmission curve with the second transmission curve. A specific combination manner is similar to the solution described in the embodiment corresponding to FIG. 3, that is, function superposition.

In this embodiment of the present disclosure, the modulator for implementing higher order modulation is provided. The modulator may modulate the received first to-be-modulated data and the received second to-be-modulated data, and output the corresponding first transmission curve and the corresponding second transmission curve. The second transmission curve and the first transmission curve are in a multiple relationship, and phase superposition is performed on the two transmission curves, to obtain a required linear result. The modulator may obtain, by controlling a superposition ratio between transmission curves, a linear result that can be modulated, to implement linear curve transmission. This embodiment is applicable to a plurality of modulation scenarios, to enhance solution flexibility.

Figure 6:
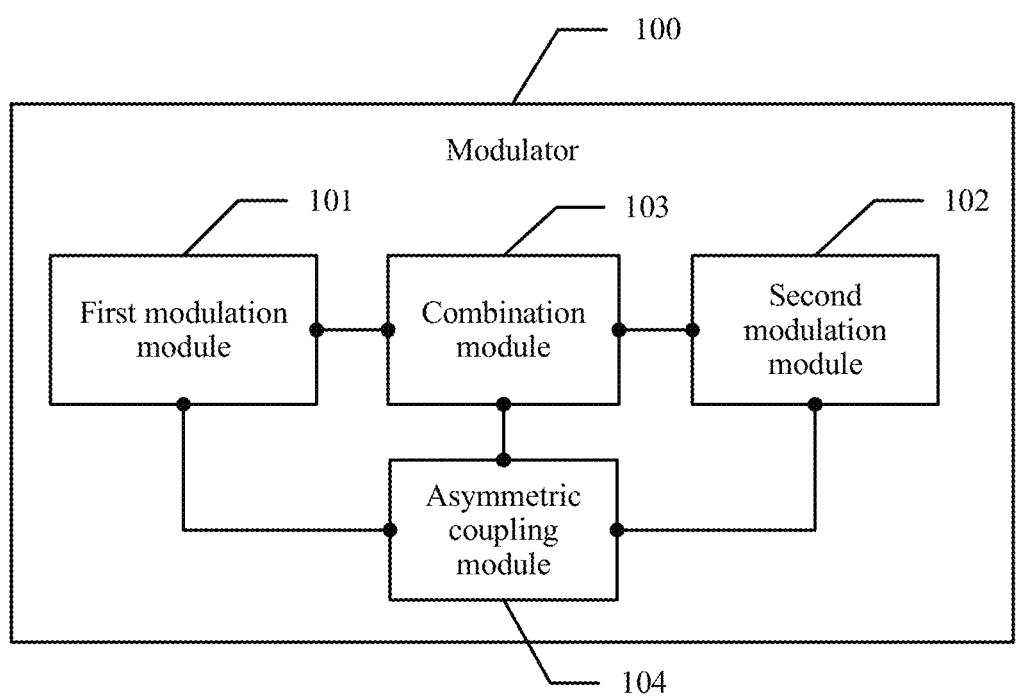
FIG. 6 is a schematic diagram of another embodiment of a modulator for implementing higher order modulation according to an embodiment of the present disclosure.

Optionally, based on the embodiment corresponding to FIG. 5, in a first optional embodiment of the modulator provided in this embodiment of the present disclosure, referring to FIG. 6, FIG. 6 is a schematic diagram of another embodiment of a modulator for implementing higher order modulation according to an embodiment of the present disclosure. The modulator 100 further includes an asymmetric coupling module 104.

The asymmetric coupling module 104 is configured to add a preset phase shift value to the first transmission curve, to obtain a shifted first transmission curve.

The combination module 103 is further configured to perform phase superposition on the shifted first transmission curve and the second transmission curve, to obtain a combined linear result.

In this embodiment, before superposing the first transmission curve and the second transmission curve, the combination module needs to perform phase shifting on the first transmission curve. A shift may be 90°, or may be another preset phase shift value specified according to an actual situation, and is not limited to 90°. The shifted first transmission curve is obtained after processing of the asymmetric coupling module, so that the combination module can perform phase superposition on the shifted first transmission curve and the second transmission curve, to obtain a modulated transmission curve through combination.

It should be noted that in actual application, the asymmetric coupling module may be a directional coupler, or may be a multimode interferometer (MMI). Herein, the directional coupler is used as the asymmetric coupling module for description, but the MMI can achieve a similar effect. Therefore, the MMI is no longer used as an example for description.

Figure 7:
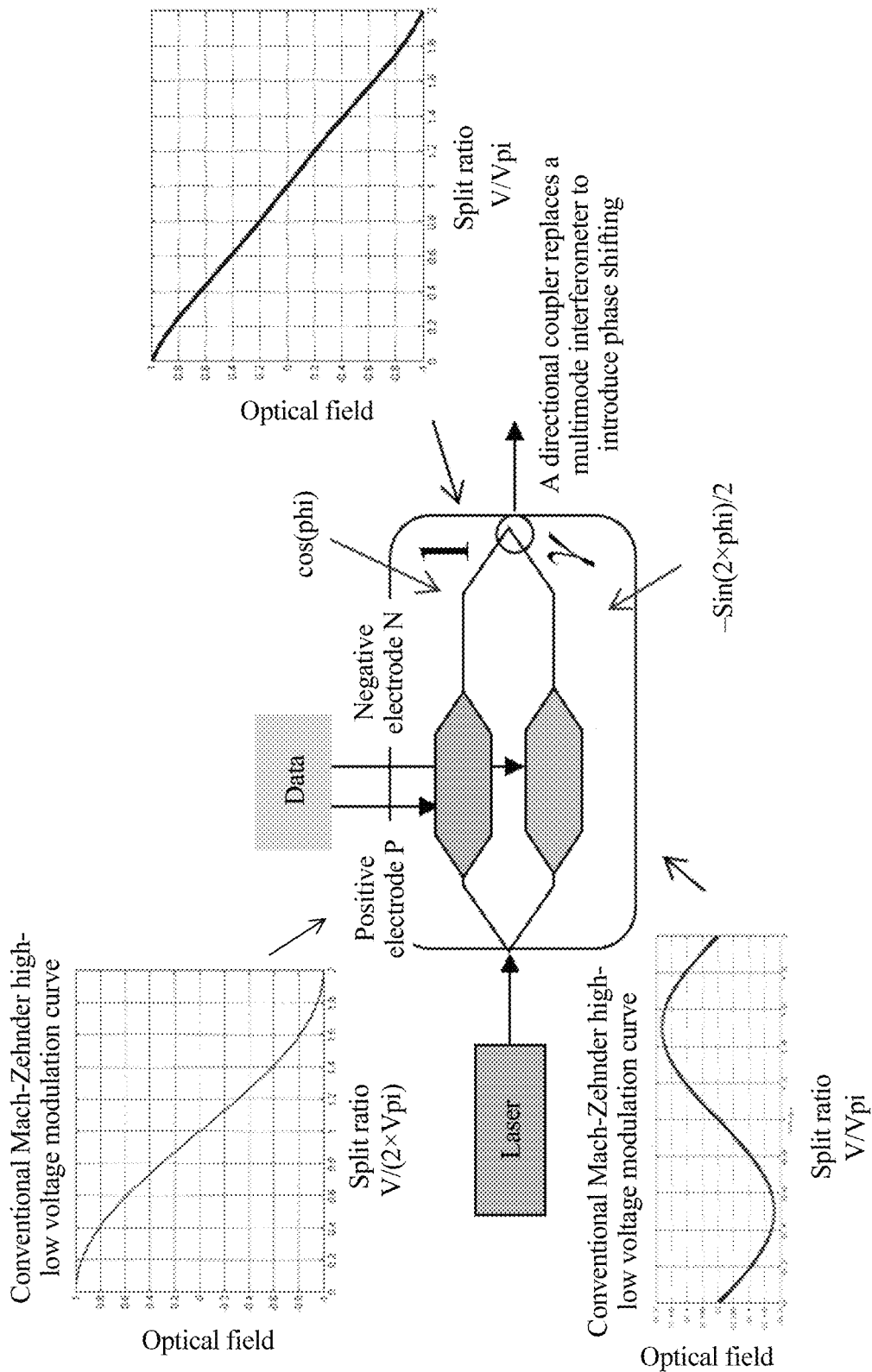
FIG. 7 is a schematic structural diagram of a modulator according to an embodiment of the present disclosure.

Specifically, referring to FIG. 7, FIG. 7 is a schematic structural diagram of a modulator according to an embodiment of the present disclosure. A directional coupler in the diagram replaces a multimode interferometer to introduce phase shifting, and then a combination module obtains a modulation curve through combination. First, a laser is enabled, and data is input into the modulator separately from a positive electrode and a negative electrode. A positive voltage is conducted in the positive electrode, and the positive voltage is $V/(2\times V_{pi})$, so that a conventional Mach-Zehnder high-low voltage modulation curve is obtained, that is, a first transmission curve. A negative voltage is conducted in the negative electrode, and the negative voltage is $V/V_{pi}$, so that a conventional Mach-Zehnder high-low voltage modulation curve is also obtained, that is, a second transmission curve. After the two transmission curves pass through an MZM device, phase shifting is separately performed on the two transmission curves. A coefficient of the positive voltage is 1, a corresponding phase shift is cos(phi), a coefficient of the negative voltage is γ, and a corresponding phase shift is −sin(2×phi)/2. The first transmission curve and the second transmission curve are superposed after the phase shifting, so that a transmission curve can be obtained when a voltage is $V/V_{pi}$.

V is a total voltage, $V_{pi}$ is a half-wave voltage, and phi represents a golden section value 0.618 (taking three significant figures). Meanings of these characters will continue to be used in the following embodiment.

Figure 8:
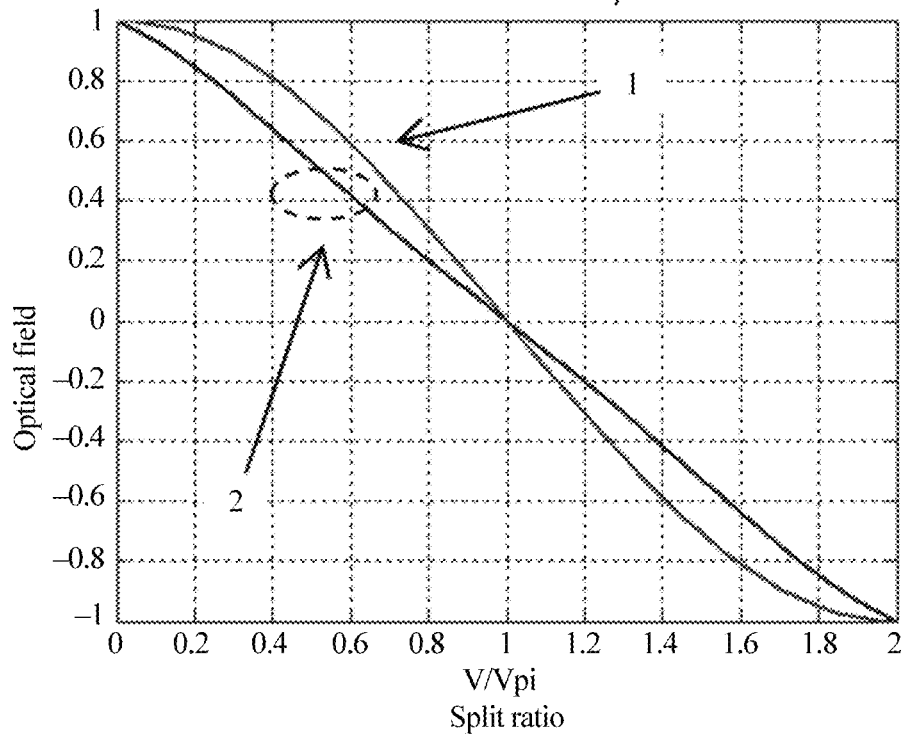
FIG. 8 is a schematic diagram of a comparison between optical field transmission curves according to an embodiment of the present disclosure.
Figure 8:
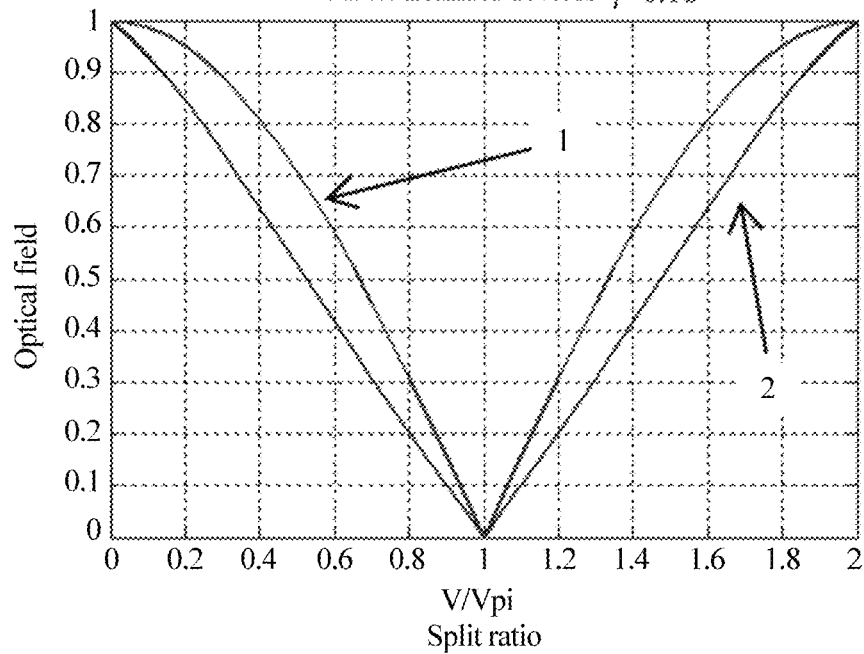

An optical field transmission curve is obtained according to the modulator corresponding to FIG. 7. Referring to FIG. 8, FIG. 8 is a schematic diagram of a comparison between optical field transmission curves according to an embodiment of the present disclosure. An upper part in FIG. 8 shows a modulation curve obtained by cascaded Mach-Zehnder devices. In addition, a curve 1 in the diagram is a curve obtained through modulation by a conventional modulator, and a curve 2 is a curve obtained through modulation by a modulator in this solution of the present disclosure. Actually, the curve 2 is obtained after modulation curves output by two MZM devices are superposed, and the two MZM devices need to have a same design structure but different output voltages in design. $V_{pi}$ of an MZM device connected to a positive voltage is twice as much as $V_{pi}$ of an MZM device connected to a negative voltage. Therefore, periods of transmission curves of the two are in a twofold relationship, that is, a period of a first transmission curve is twice as much as a period of a second transmission curve. During combination, a directional coupler is used to introduce phase shifting of 90°. In addition, it can be learned from FIG. 8 that when γ is close to 0.18, a transmission curve is more linear, and γ is a specified optical field strength ratio. A lower part in FIG. 8 is an absolute value function of an optical field transmission curve. A curve 1 in the diagram is a curve obtained through modulation by a conventional modulator, and a curve 2 is a curve obtained through modulation by a modulator in this solution of the present disclosure. A same conclusion may be obtained according to the absolute value function of the optical field transmission curve, that is, the curve 2 is more linear. Therefore, a transmission curve obtained through modulation in the foregoing method is better.

According to a modulator structure provided in this solution of the present disclosure, in a method for cascading MZM devices, two MZMs whose $V_{pi}$ are in a multiple relationship are cascaded, and a combined transmission curve is obtained by using a specified optical field strength ratio (1:0.18) for superposition, so that the transmission curve becomes a linear transmission function.

In addition, in this embodiment of the present disclosure, the asymmetric coupling module is added to the modulator. The asymmetric coupling module may be a directional coupler, or may be an MMI. The asymmetric coupling module is mainly configured to add phase shifting, so that before a transmission curve is obtained through combination, a phase of the pre-obtained first transmission curve is adjusted, to combine with a phase of the second transmission curve more quickly and accurately, so as to avoid a case in which a combined transmission curve cannot achieve an expected effect because of a phase difference. The asymmetric coupling module may be used to improve practical applicability and feasibility of this solution, and a function of the directional coupler in the asymmetric coupling module is similar to that of the multimode interferometer. In actual application, a suitable instrument may be selected according to a requirement, to improve diversity of this solution.

Figure 9:
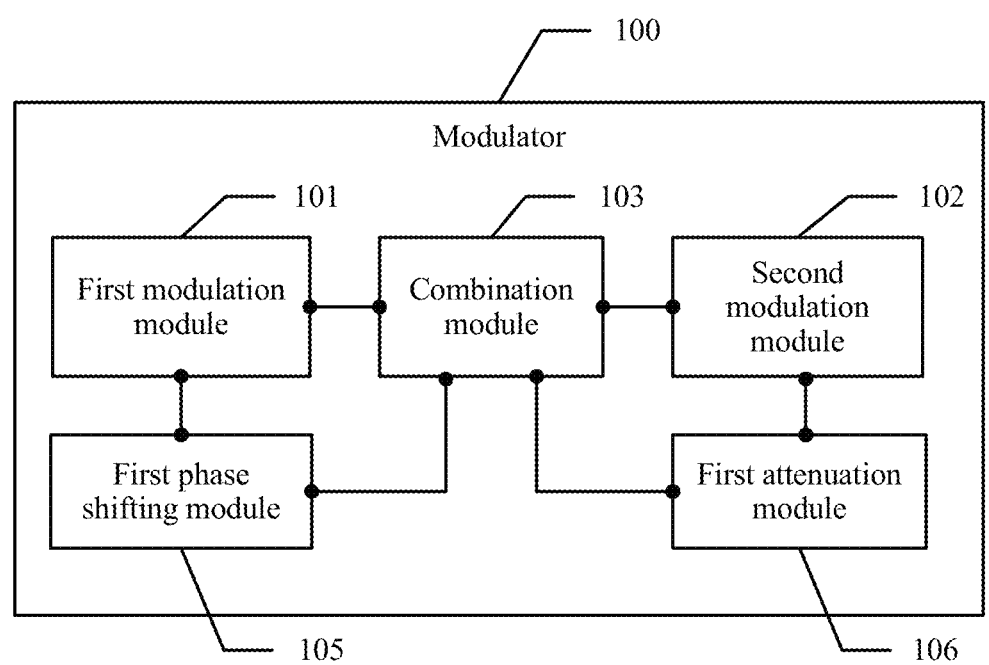
FIG. 9 is a schematic diagram of another embodiment of a modulator for implementing higher order modulation according to an embodiment of the present disclosure.

Optionally, based on the embodiment corresponding to FIG. 5, in a second optional embodiment of the modulator provided in this embodiment of the present disclosure, referring to FIG. 9, FIG. 9 is a schematic diagram of another embodiment of a modulator for implementing higher order modulation according to an embodiment of the present disclosure. The modulator 100 further includes a first phase shifting module 105 and a first attenuation module 106.

The first phase shifting module 105 is configured to: adjust phases of the first transmission curve and the second transmission curve, to obtain an adjusted first transmission curve and an adjusted second transmission curve, so that the combination module performs phase superposition on the adjusted first transmission curve and the adjusted second transmission curve, to obtain a combined linear result.

The first attenuation module 106 is configured to: control a curve ratio of the adjusted first transmission curve to the adjusted second transmission curve, pre-compensate the linear result according to the curve ratio, and output a pre-compensated linear result.

In this embodiment, before the combination module superposes the first transmission curve and the second transmission curve, the first phase shifting module may be introduced, and a main function of the first phase shifting module is to adjust the phases of the first transmission curve and the second transmission curve. An adjustment method is: performing phase shifting on the first transmission curve or the second transmission curve, or simultaneously performing phase shifting on the first transmission curve and the second transmission curve. A specific shifting angle is set according to an actual situation, and this is not limited herein. The combination module performs phase superposition on the adjusted first transmission curve and the second transmission curve, to obtain a required linear result. The linear result is a most linear part in a transmission curve. Similarly, the combination module may perform phase superposition on the first transmission curve and the adjusted second transmission curve, or perform phase superposition on the adjusted first transmission curve and the adjusted second transmission curve. A specific situation is appropriately adjusted according to an actual requirement.

In addition, the first attenuation module may be further introduced during the modulation. The first attenuation module is configured to control the curve ratio of the adjusted first transmission curve to the adjusted second transmission curve. After the first attenuation module is added, a curve shape may be adjusted. Pre-compensation is performed according to the linear result obtained by the first phase shifting module, so that a more linear result can be obtained.

Non-linear damage affects all long-distance optical transmission systems unless an optical power in a system channel keeps very low on purpose. Therefore, in a pre-compensation method, a more linear result can be obtained. This is especially true for a coherent-orthogonal frequency division multiplexing (English full name: Coherent-Orthogonal Frequency Division Multiplexing, CO-OFDM for short) technology system with a very high peak-to-average power ratio (PAPR). Because an optical orthogonal frequency division multiplexing (OFDM) signal is obtained by overlapping a series of sub-channel signals, a time domain signal with a high PAPR is easily obtained. Compared with a wireless communications system, an optical fiber communications system belongs to non-linear medium transmission. Because a frequency spectrum interval between subcarriers in an optical OFDM system is small, a walk-off effect between the subcarriers is weak, and a condition for interplay of non-linear four-wave mixing (FWM) is easy to meet, resulting in crosstalk.

In an OFDM system, because a high PAPR causes serious non-linear damage, impact of the non-linear damage can be reduced by lowering a PAPR. Some methods have been studied to lower a PAPR in the OFDM system, such as an amplitude limiting technology, precoding, a partial transmission technology, selectivity mapping, and an optical phase modulator. The amplitude limiting technology is the simplest and widely used technology in a real-time processing system, but amplitude limiting noise is introduced, affecting system performance. In other methods, additional complexity, encoding overheads, additional added optical devices, and the like are increased.

Figure 10:
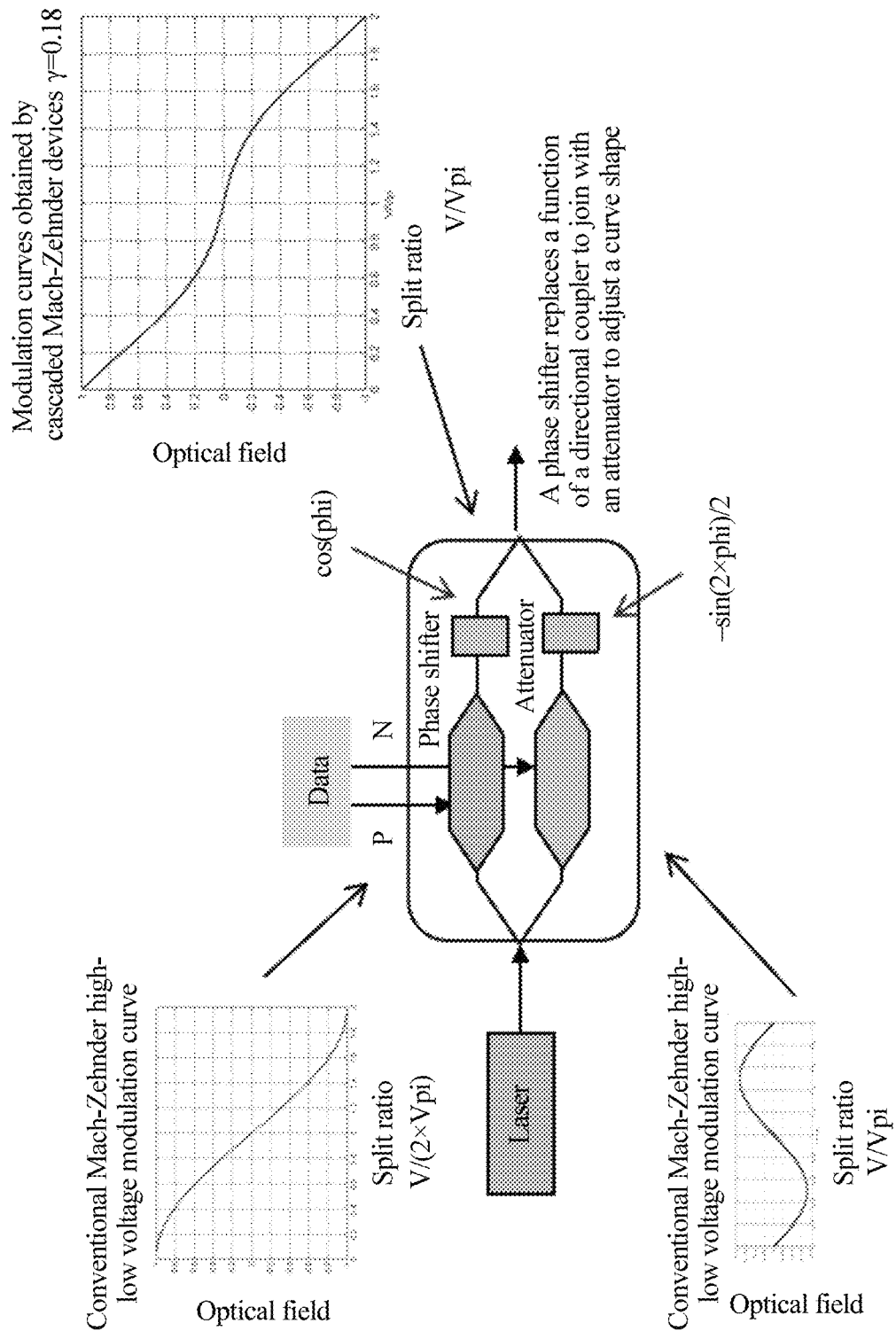
FIG. 10 is another schematic structural diagram of a modulator according to an embodiment of the present disclosure.

Specifically, referring to FIG. 10, FIG. 10 is another schematic structural diagram of a modulator according to an embodiment of the present disclosure. In the diagram, before a combination module obtains a modulation curve through combination, a phase shifter and an attenuator may be further introduced. The phase shifter is configured to adjust phases of a first transmission curve and a second transmission curve with a large amplitude, and the attenuator is configured to pre-compensate a combined transmission curve with a small amplitude. First, a laser is enabled, and data is input into the modulator separately from a positive electrode and a negative electrode. A positive voltage is conducted in the positive electrode, and the positive voltage is $V/(2 \times V_{pi})$, so that a conventional Mach-Zehnder high-low voltage modulation curve is obtained, that is, a first transmission curve. A negative voltage is conducted in the negative electrode, and the negative voltage is $V/V_{pi}$, so that a conventional Mach-Zehnder high-low voltage modulation curve is also obtained, that is, a second transmission curve. The two transmission curves first pass through an MZM device, and then the phase shifter performs phase shifting on the two curves, so that initial phases are consistent after superposition. A phase shift corresponding to the positive voltage is $\cos(\text{phi})$, a phase shift corresponding to the negative voltage is $-\sin(2 \times \text{phi})/2$, and the first transmission curve and the second transmission curve are superposed after the phase shifting, so that a transmission curve can be obtained when a voltage is $V/V_{pi}$. However, the transmission curve can further tend to be more linear. In this case, the attenuator needs to pre-compensate the obtained transmission curve, to obtain a linear result by controlling a ratio between two optical fields.

Figure 11:
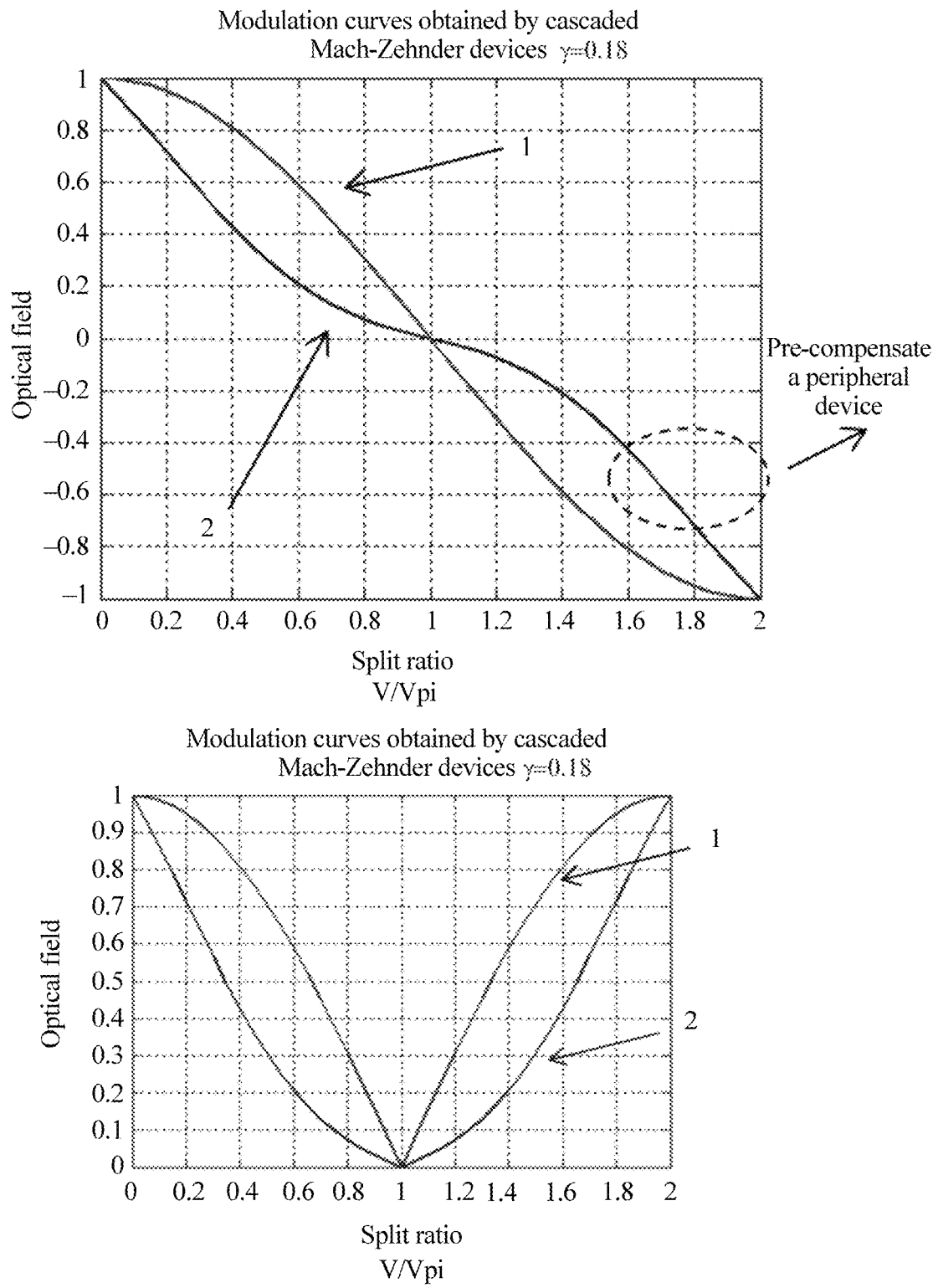
FIG. 11 is another schematic diagram of a comparison between optical field transmission curves according to an embodiment of the present disclosure.

An optical field transmission curve is obtained according to the modulator corresponding to FIG. 10. Referring to FIG. 11, FIG. 11 is another schematic diagram of a comparison between optical field transmission curves according to an embodiment of the present disclosure. An upper part in FIG. 11 shows a modulation curve obtained by cascaded Mach-Zehnder devices. In addition, a curve 1 in the diagram is a curve obtained through modulation by a conventional modulator, and a curve 2 is a curve obtained through modulation by a modulator in this solution of the present disclosure. Actually, the curve 2 is obtained after modulation curves output by two MZM devices are superposed, and the two MZM devices need to have a same design structure but different output voltages in design. $V_{pi}$ of an MZM device connected to a positive voltage is twice as much as $V_{pi}$ of an MZM device connected to a negative voltage. Therefore, periods of transmission curves of the two are in a twofold relationship, that is, a period of a first transmission curve is twice as much as a period of a second transmission curve. During combination, the phase shifter is used to control a phase, and the attenuator controls a ratio between two optical fields. It can be learned from FIG. 11 that when γ is close to 0.4, a transmission curve may be used to perform pre-compensation processing on a received signal, so that the transmission curve is more linear, and γ is a specified optical field strength ratio. A lower part in FIG. 11 is an absolute value function of an optical field transmission curve. A curve 1 in the diagram is a curve obtained through modulation by a conventional modulator, and a curve 2 is a curve obtained through modulation by a modulator in this solution of the present disclosure. A same conclusion may be obtained according to the absolute value function of the optical field transmission curve, that is, a linear effect of the curve 2 is more obvious.

According to a modulator structure provided in this solution of the present disclosure, in a method for cascading MZM devices, two MZMs whose $V_{pi}$ are in a multiple relationship are cascaded, and a combined transmission curve is obtained by using a specified optical field strength ratio (1:0.4) for superposition, so that the transmission curve is used to pre-compensate a non-linear device.

Further, in this embodiment of the present disclosure, the phase shifter and the attenuator are added to the modulator, so that a transmission curve modulated by the modulator is adjusted, to enhance flexibility. Compared with adjustment performed on a phase of only the first transmission curve, two or more transmission curves may be adjusted, so as to achieve a better combination effect. The attenuator is added to the modulator, so that a peripheral electrical device can be pre-compensated. This embodiment is applicable to a multi-level modulation scenario and a higher order modulation scenario, so that practical applicability and feasibility of this solution are improved.

Optionally, based on the embodiment corresponding to FIG. 5, in a third optional embodiment of the modulator provided in this embodiment of the present disclosure, the modulator further includes a third modulation module, a second phase shifting module, and a second attenuation module.

The third modulation module is configured to: receive third to-be-modulated data, and output a third transmission curve according to the third to-be-modulated data, where a period of the third transmission curve is half of the period of the second transmission curve.

The second phase shifting module is configured to: adjust phases of the first transmission curve, the second transmission curve, and the third transmission curve, to obtain the adjusted first transmission curve, the adjusted second transmission curve, and an adjusted third transmission curve, so that the combination module performs phase superposition on the adjusted first transmission curve, the adjusted second transmission curve, and the adjusted third transmission curve, to obtain a combined linear result.

The second attenuation module is configured to: control a curve ratio of the adjusted first transmission curve, the adjusted second transmission curve, and the adjusted third transmission curve, pre-compensate the linear result according to the curve ratio, and output a pre-compensated linear result.

Figure 12:
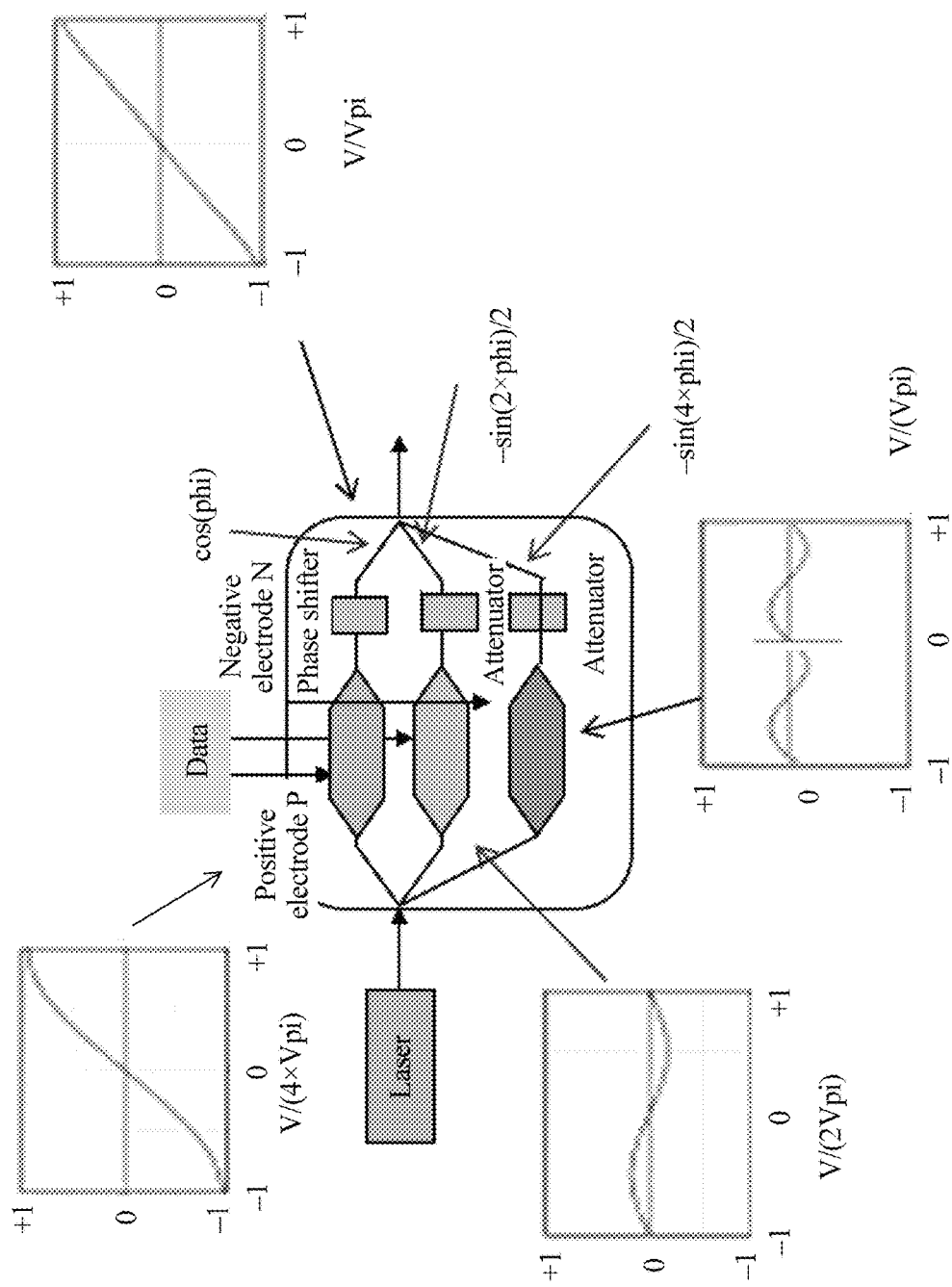
FIG. 12 is another schematic structural diagram of a modulator according to an embodiment of the present disclosure.

This embodiment is applied to a case in which a plurality of curves whose periods are in a multiple relationship in a modulator are superposed. Referring to FIG. 12, FIG. 12 is another schematic structural diagram of a modulator according to an embodiment of the present disclosure. In the diagram, three MZM devices are used as an example for description. In actual application, this is not limited to a modulator with cascaded three MZM devices. First, a laser is enabled, and data is separately input into three receiving modules. The first modulation module receives first to-be-modulated data, and outputs a first transmission curve according to the first to-be-modulated data. The second modulation module receives second to-be-modulated data, and outputs a second transmission curve according to the second to-be-modulated data. A period of the second transmission curve is half of a period of the first transmission curve. The newly added third modulation module receives third to-be-modulated data, and outputs a third transmission curve according to the third to-be-modulated data. A period of the third transmission curve is half of the period of the second transmission curve.

After the first transmission curve, the second transmission curve, and the third transmission curve are obtained, the second phase shifting module adjusts phases of the three. It may be understood that a design structure of the second phase shifting module is basically consistent with that of the first phase shifting module, and does not need to be redesigned. After the second phase shifting module adjusts the phases, an adjusted first transmission curve, an adjusted second transmission curve, and an adjusted third transmission curve may be obtained. The three transmission curves have a same initial phase, so that the combination module can perform phase superposition on the three transmission curves, to obtain a combined linear result.

It should be noted that the first transmission curve is obtained when a voltage is $V/(4 \times V_{pi})$, an expression of an obtained modulation curve is $\sqrt{1-t} \cdot \sin(\phi)$, a corresponding phase shift is cos(phi). The second transmission curve is obtained when a voltage is $V/(2 \times V_{pi})$, an expression of an obtained modulation curve is $\sqrt{t} \cdot \sin(2\phi)/2$, and a corresponding phase shift is $-\sin(2 \times phi)/2$. The third transmission curve is obtained when a voltage is $V/(V_{pi})$, an expression of an obtained modulation curve is $\sqrt{t} \cdot \sin(2\phi)/2$, and a corresponding phase shift is $-\sin(4 \times phi)/2$.

The combination module may perform phase superposition on the three transmission curves. After the combined linear result is obtained, the second attenuation module controls a curve ratio of the adjusted first transmission curve to the adjusted second transmission curve to the adjusted third transmission curve, pre-compensates the pre-obtained linear result according to the curve ratio, and outputs a pre-compensated linear result. The compensated linear result is more linear.

According to a modulator structure provided in this solution of the present disclosure, in a method for cascading MZM devices, three MZMs whose $V_{pi}$ are in a multiple relationship are cascaded, and a combined transmission curve is obtained by using a specified optical field strength ratio (1:0.12) for superposition, so that the transmission curve becomes a linear transmission function.

In addition, in this embodiment of the present disclosure, a modulator for superposing and combining a plurality of transmission curves is provided, and periods of the plurality of transmission curves are in a multiple relationship. The second phase shifting module adjusts phases of the plurality of transmission curves, and the second attenuation module pre-compensates a combined transmission curve, so that a modulation curve output by the modulator is more linear. In addition, a linear result obtained after the plurality of transmission curves are superposed is more accurate.

Optionally, based on the embodiment corresponding to FIG. 9, in the second optional embodiment of the modulator provided in this embodiment of the present disclosure, the first modulation module is connected to the first phase shifting module, and the first phase shifting module is connected to the first attenuation module by using the second modulation module.

Figure 13:
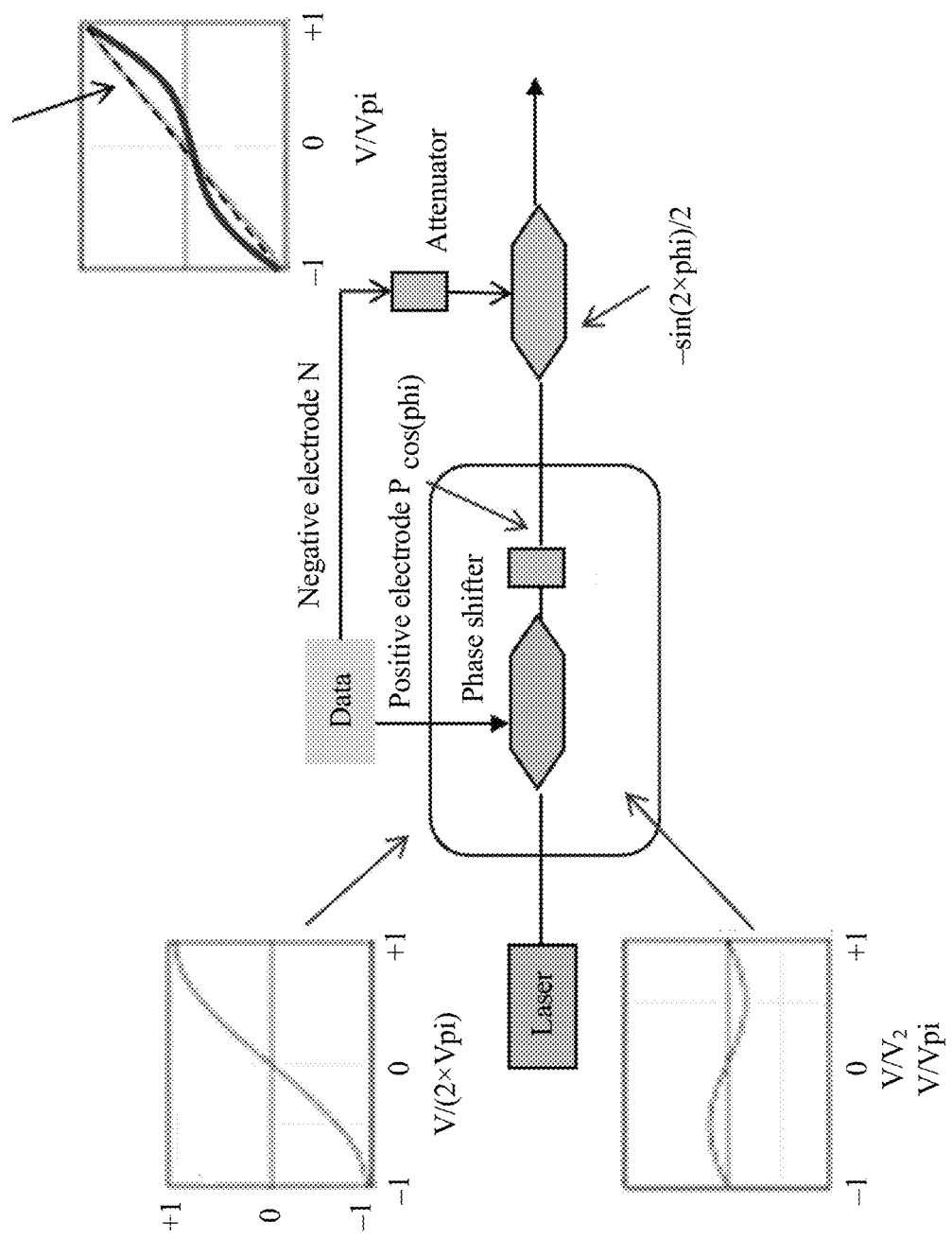
FIG. 13 is another schematic structural diagram of a modulator according to an embodiment of the present disclosure.

This embodiment is applied to a case in which a plurality of curves whose periods are in a multiple relationship in a modulator are superposed. In addition, a plurality of MZM devices in the modulator are switched from a parallel connection to a serial connection, and a structure is changed. Referring to FIG. 13, FIG. 13 is another schematic structural diagram of a modulator according to an embodiment of the present disclosure. In the diagram, two MZM devices are used as an example for description. In actual application, this is not limited to a modulator with cascaded three MZM devices. First, a laser is enabled, and data is separately input into two receiving modules. The first modulation module receives first to-be-modulated data, and outputs a first transmission curve according to the first to-be-modulated data. The second modulation module receives second to-be-modulated data, and outputs a second transmission curve according to the second to-be-modulated data. A period of the second transmission curve is half of a period of the first transmission curve.

A structure of the modulator is changed, so that the first modulation module is connected to the first phase shifting module, and the first phase shifting module may directly perform phase shifting on the first transmission curve output by the first modulation module. Data input from a negative voltage first passes through the first attenuation module, and pre-compensation processing is performed on the received data. Then, compensated second to-be-modulated data is input into the second modulation module, and the second modulation module outputs the second transmission curve according to the compensated second to-be-modulated data. Finally, a first transmission curve obtained after phase shifting and the second transmission curve are superposed, to obtain a modulated transmission curve through combination.

However, when the modulator is designed in a serial cascading manner, a control point needs to be optimized. Specifically, the control point may be a signal receiving part. If more accurate data needs to be obtained, a received signal needs to be amplified, to achieve an optimal use effect.

Further, in this embodiment of the present disclosure, a modulator structure is provided, so that a plurality of transmission curves can be superposed and combined, and the first phase shifting module adjusts a phase of the first transmission curve. The first attenuation module pre-compensates the second transmission curve, to obtain a more linear curve. In addition, in this solution of the present disclosure, parallel cascading changes into serial cascading, to form another modulator structure with an adjustable transmission curve, so that the modulator structure is more diversified, and is easy to design and apply, thereby improving feasibility of this solution.

In an embodiment of the present disclosure, a system for implementing higher order modulation is further provided. The system includes two or more modulators. The modulator is the modulator according to any one of the embodiment corresponding to FIG. 5, the first optional embodiment corresponding to FIG. 5, the embodiment corresponding to FIG. 9, the first optional embodiment corresponding to FIG. 9, and the second optional embodiment corresponding to FIG. 9.

In this embodiment, a modulator structure is further optimized, that is, a plurality of modulators are cascaded to obtain a system for implementing higher order modulation, so that segmentation optimization can be directly performed on data, that is, each modulator optimizes data, to obtain a more linear modulation curve.

Figure 14:
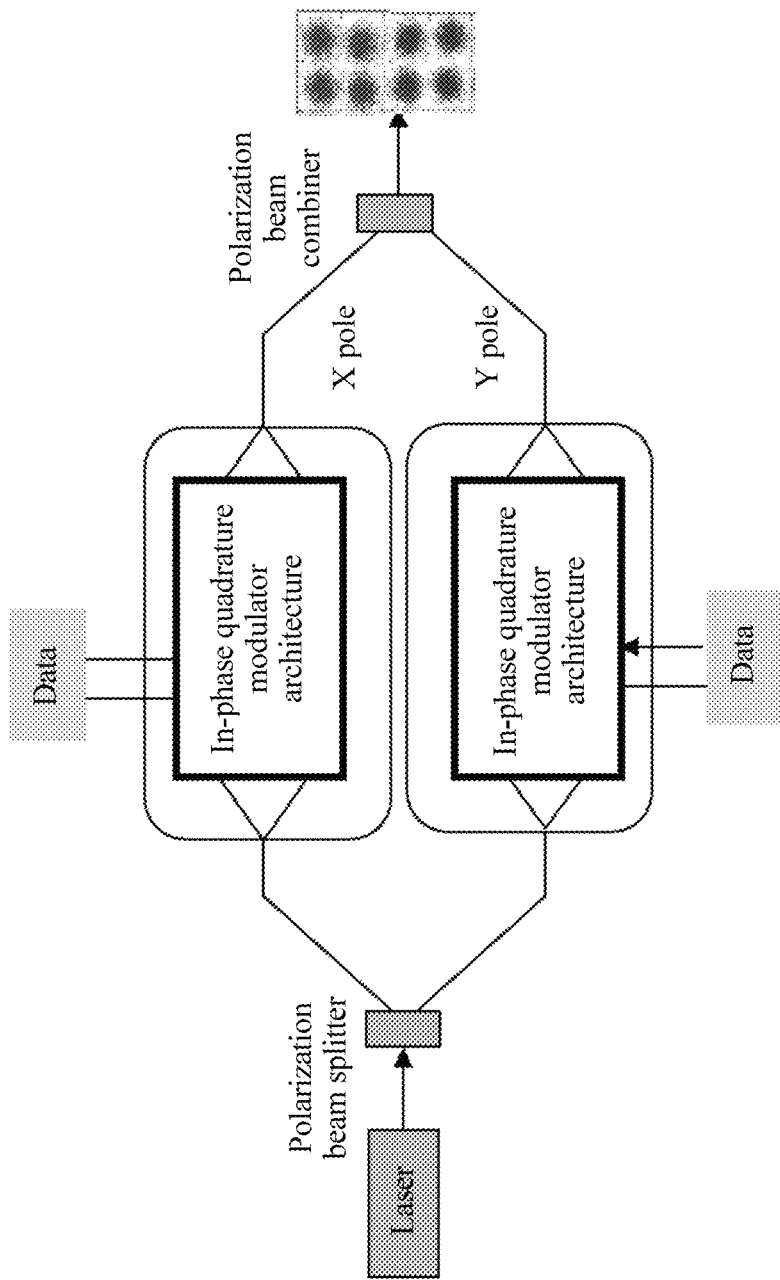
FIG. 14 is a modulation structure of dual-polarization quadrature phase shift keying/quadrature amplitude modulation according to an embodiment of the present disclosure.

Referring to FIG. 14, FIG. 14 is a modulation structure of dual-polarization quadrature phase shift keying/quadrature amplitude modulation according to an embodiment of the present disclosure. First, a laser is enabled. After a light passes through a polarization beam splitter, two lights with different vibration directions are split. A system for implementing higher order modulation includes a plurality of modulators. These modulators are a superposed in-phase quadrature (IQ) modulator architecture. IQ modulation means that data is split into two paths of data, carrier modulation is separately performed on the two paths of data, and two paths of carriers are quadrature. The IQ modulation is related to a vector direction. In-phase means that signals have a same vector direction. Quadrature components are two quadrature signal vectors (a difference is 90°). IQ signals include one path of 0° and 180° and another path of 90° and 270°, are separately called as an I path and a Q path, and are two paths of quadrature signals.

Each IQ modulator architecture is formed through superposition of two or more modulators. After receiving data, the IQ modulator architecture receives two or more transmission curves that are similar to a more linear transmission curve output by the modulator in the foregoing embodiment, performs phase shifting, and controls an optical field ratio, to obtain a modulated transmission curve through combination. The curve is more linear.

The IQ modulator architecture outputs modulated transmission curves separately in directions of the x-axis and the y-axis to a polarization beam combiner. The polarization beam combiner combines the transmission curves on the x-axis and on the y-axis, to obtain a modulated signal.

In this embodiment of the present disclosure, a modulation system including a plurality of modulators is provided, so that a modulator structure can be further optimized, and segmentation processing is directly performed on a signal. An IQ modulator architecture formed through superposition of modulators implements modulation of various code patterns, to enhance solution flexibility, and can be used for modulation of a higher order code pattern. In addition, in this embodiment of the present disclosure, dependence on digital signal processing is lowered, and partial signals are directly processed in an optical path, thereby improving signal quality.

Figure 15:
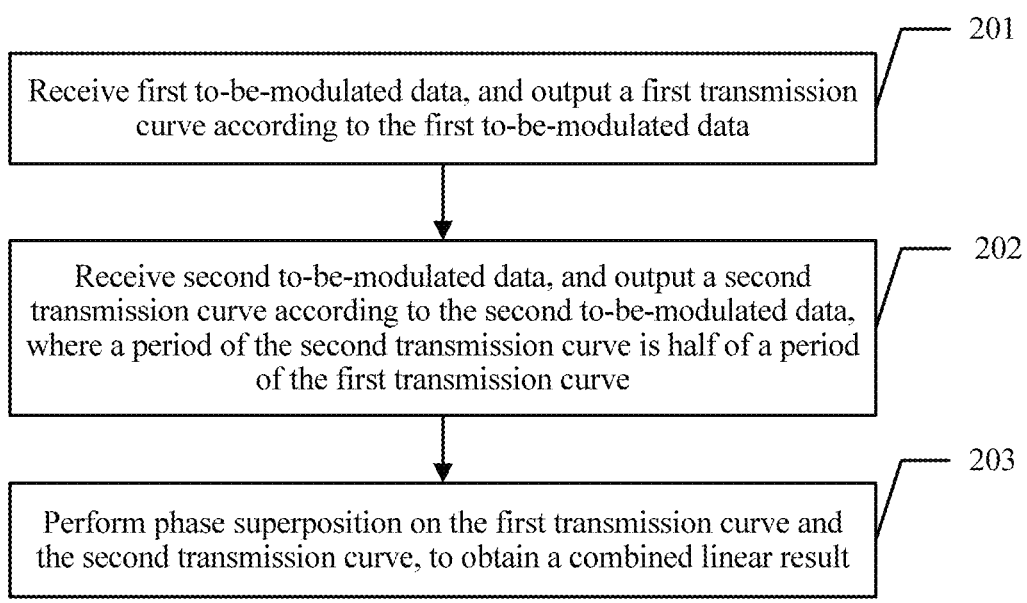
FIG. 15 is a schematic diagram of an embodiment of a method for implementing higher order modulation according to an embodiment of the present disclosure.

An embodiment of the present disclosure provides a method for implementing higher order modulation. For ease of description, description is provided from a perspective of a modulator. Referring to FIG. 15, FIG. 15 is a schematic flowchart of a method for implementing higher order modulation. The method for implementing higher order modulation may include the following steps.

201. Receive first to-be-modulated data, and output a first transmission curve according to the first to-be-modulated data.

In this embodiment, under control of a positive voltage, a modulator for implementing higher order modulation receives the first to-be-modulated data, and outputs the first to-be-modulated data, to obtain the corresponding first transmission curve, and the first transmission curve is sinusoidal.

202. Receive second to-be-modulated data, and output a second transmission curve according to the second to-be-modulated data, where a period of the second transmission curve is half of a period of the first transmission curve.

In this embodiment, under control of a negative voltage, the modulator for implementing higher order modulation receives the second to-be-modulated data, and outputs the second to-be-modulated data, to obtain the corresponding second transmission curve. Similarly, the second transmission curve is sinusoidal. However, because there is a voltage difference between the positive voltage and the negative voltage, and the negative voltage is half of the positive voltage, the period of the obtained second transmission curve is half of the period of the first transmission curve.

203. Perform phase superposition on the first transmission curve and the second transmission curve, to obtain a combined linear result.

In this embodiment, the modulator performs phase superposition on the first transmission curve and the second transmission curve, to obtain the combined linear result. A specific manner of combining two curves by the modulator is similar to the solution described in the embodiment corresponding to FIG. 3. Details are not described herein again.

In this embodiment of the present disclosure, the method for implementing higher order modulation is provided. The modulator modulates the received first to-be-modulated data and the received second to-be-modulated data, and outputs the corresponding first transmission curve and the corresponding second transmission curve. The second transmission curve and the first transmission curve are in a multiple relationship, and phase superposition is performed on the two transmission curves, to obtain a required linear result. The modulator may obtain, by controlling a superposition ratio between transmission curves, a linear result that can be modulated, to implement linear curve transmission. This embodiment is applicable to a plurality of modulation scenarios, to enhance solution flexibility.

Optionally, based on the embodiment corresponding to FIG. 15, in a first optional embodiment of the method for implementing higher order modulation provided in this embodiment of the present disclosure, before the performing phase superposition on the first transmission curve and the second transmission curve, the method may further include:

adding a preset phase shift value to the first transmission curve, to obtain a shifted first transmission curve; and the performing phase superposition on the first transmission curve and the second transmission curve, to obtain a combined linear result may include:

performing phase superposition on the shifted first transmission curve and the second transmission curve, to obtain a combined linear result.

In this embodiment, before superposing the first transmission curve and the second transmission curve, the modulator needs to perform phase shifting on the first transmission curve. A shift may be 90°, or may be another preset phase shift value specified according to an actual situation, and is not limited to 90°. After the shifted first transmission curve is obtained, phase superposition may be performed on the shifted first transmission curve and the second transmission curve, to obtain a modulated transmission curve through combination.

Further, in this embodiment of the present disclosure, a method for adding phase shifting to a modulator is provided, so that before a transmission curve is obtained through combination, a phase of the pre-obtained first transmission curve is adjusted, to combine with a phase of the second transmission curve more quickly and accurately, so as to avoid a case in which a combined transmission curve cannot achieve an expected effect because of a phase difference, thereby improving practical applicability and feasibility of this solution. In addition, in actual application, a suitable instrument may be selected according to a requirement, to improve diversity of this solution.

Optionally, based on the embodiment corresponding to FIG. 15, in a second optional embodiment of the method for implementing higher order modulation provided in this embodiment of the present disclosure, before the performing phase superposition on the first transmission curve and the second transmission curve, the method may further include:

adjusting phases of the first transmission curve and the second transmission curve, to obtain an adjusted first transmission curve and an adjusted second transmission curve, so that phase superposition is performed on the adjusted first transmission curve and the adjusted second transmission curve; and controlling a curve ratio of the adjusted first transmission curve to the adjusted second transmission curve, pre-compensating the linear result according to the curve ratio, and outputting a pre-compensated linear result.

In this embodiment, before the first transmission curve and the second transmission curve are superposed, the phases of the first transmission curve and the second transmission curve may be adjusted. An adjustment method is: performing phase shifting on the first transmission curve or the second transmission curve, or simultaneously performing phase shifting on the first transmission curve and the second transmission curve. A specific shifting angle is set according to an actual situation, and this is not limited herein. The modulator performs phase superposition on the adjusted first transmission curve and the second transmission curve, to obtain a required linear result. The linear result is a most linear part in a transmission curve. Similarly, the modulator may perform phase superposition on the first transmission curve and the adjusted second transmission curve, or perform phase superposition on the adjusted first transmission curve and the adjusted second transmission curve. A specific situation is appropriately adjusted according to an actual requirement.

In the foregoing situation, the curve ratio of the adjusted first transmission curve to the adjusted second transmission curve may be further controlled, to adjust a curve shape. Pre-compensation is performed according to the obtained linear result, so that a more linear result can be obtained.

Non-linear damage affects all long-distance optical transmission systems unless an optical power in a system channel keeps very low on purpose. Therefore, in a pre-compensation method, a more linear result can be obtained. This is especially true for a CO-OFDM technology system with a very high PAPR. Because an optical OFDM signal is obtained by overlapping a series of sub-channel signals, a time domain signal with a high PAPR is easily obtained. Compared with a wireless communications system, an optical fiber communications system belongs to non-linear medium transmission. Because a frequency spectrum interval between subcarriers in an optical OFDM system is small, a walk-off effect between subcarriers is weak, and a condition for interplay of non-linear FWM is easy to meet, resulting in crosstalk.

In an OFDM system, because a high PAPR causes serious non-linear damage, impact of the non-linear damage can be reduced by lowering a PAPR. Some methods have been studied to lower a PAPR in the OFDM system, such as an amplitude limiting technology, precoding, a partial transmission technology, selectivity mapping, and an optical phase modulator. The amplitude limiting technology is the simplest and widely used technology in a real-time processing system, but amplitude limiting noise is introduced, affecting system performance. In other methods, additional complexity, encoding overheads, additional added optical devices, and the like are increased.

Further, in this embodiment of the present disclosure, a method for adjusting a transmission curve modulated by the modulator is provided, to enhance flexibility. Compared with adjustment performed on a phase of only the first transmission curve, two or more transmission curves may be adjusted, so as to achieve a better combination effect. An attenuator is added to the modulator, so that a peripheral electrical device can be pre-compensated. This embodiment is applicable to a multi-level modulation scenario and a higher order modulation scenario, so that practical applicability and feasibility of this solution are improved.

Optionally, based on the embodiment corresponding to FIG. 15, in a third optional embodiment of the method for implementing higher order modulation provided in this embodiment of the present disclosure, after the receiving second to-be-modulated data, and outputting a second transmission curve according to the second to-be-modulated data, the method may further include:

receiving third to-be-modulated data, and outputting a third transmission curve according to the third to-be-modulated data, where a period of the third transmission curve is half of the period of the second transmission curve;

adjusting phases of the first transmission curve, the second transmission curve, and the third transmission curve, to obtain an adjusted first transmission curve, an adjusted second transmission curve, and an adjusted third transmission curve, so that phase superposition is performed on the adjusted first transmission curve, the adjusted second transmission curve, and the adjusted third transmission curve; and controlling a curve ratio of the adjusted first transmission curve to the adjusted second transmission curve to the adjusted third transmission curve, pre-compensating the linear result according to the curve ratio, and outputting a pre-compensated linear result.

In this embodiment, first, a laser is enabled, and data is separately input into the modulator. The first to-be-modulated data is received, and the first transmission curve is output according to the first to-be-modulated data. The second to-be-modulated data is received, and the second transmission curve is output according to the second to-be-modulated data. The period of the second transmission curve is half of the period of the first transmission curve. The third to-be-modulated data is received, and the third transmission curve is output according to the third to-be-modulated data. The period of the third transmission curve is half of the period of the second transmission curve.

After the first transmission curve, the second transmission curve, and the third transmission curve are obtained, phases of the three are adjusted. After the phases are adjusted, the adjusted first transmission curve, the adjusted second transmission curve, and the adjusted third transmission curve may be obtained. The three transmission curves have a same initial phase, and phase superposition may be performed on the three transmission curves, to obtain a combined linear result.

The curve ratio of the adjusted first transmission curve to the adjusted second transmission curve to the adjusted third transmission curve is controlled, the pre-obtained linear result is pre-compensated according to the curve ratio, and the pre-compensated linear result is output. The compensated linear result is more linear.

In addition, in this embodiment of the present disclosure, a method for superposing and combining a plurality of transmission curves is provided, and periods of the plurality of transmission curves are in a multiple relationship. Phases of the plurality of transmission curves are adjusted, and a combined transmission curve is pre-compensated, so that a modulation curve output by the modulator is more linear. In addition, a linear result obtained after the plurality of transmission curves are superposed is more accurate.

Optionally, based on the second embodiment corresponding to FIG. 15, in a fourth optional embodiment of the method for implementing higher order modulation provided in this embodiment of the present disclosure, after the receiving first to-be-modulated data, and outputting a first transmission curve according to the first to-be-modulated data, the method may further include:

adjusting a phase of the first transmission curve; and after the receiving second to-be-modulated data, and outputting a second transmission curve according to the second to-be-modulated data, the method may further include:

controlling a curve ratio of the adjusted first transmission curve to the second transmission curve.

This embodiment is applied to a case in which a plurality of curves whose periods are in a multiple relationship in a modulator are superposed. In addition, a plurality of MZM devices in the modulator are switched from a parallel connection to a serial connection, and a structure is changed.

Specifically, first, a laser is enabled, and data is separately input into the modulator. The modulator receives the first to-be-modulated data, and outputs the first transmission curve according to the first to-be-modulated data; and receives the second to-be-modulated data, and outputs the second transmission curve according to the second to-be-modulated data. The period of the second transmission curve is half of the period of the first transmission curve.

A structure of the modulator is changed, so that phase shifting can be directly performed the output first transmission curve, and pre-compensation processing is performed on data input from the negative voltage. Then, the compensated second to-be-modulated data is output, to obtain the second transmission curve. Finally, the first transmission curve obtained after phase shifting and the second transmission curve are superposed, to obtain a modulated transmission curve through combination.

However, when the modulator is designed in a serial cascading manner, a control point needs to be optimized. Specifically, the control point may be a signal receiving part. If more accurate data needs to be obtained, a received signal needs to be amplified, to achieve an optimal use effect.

Further, in this embodiment of the present disclosure, a modulation method is provided, so that a plurality of transmission curves can be superposed and combined, and the phase of the first transmission curve is adjusted. In addition, the second transmission curve is pre-compensated, to obtain a more linear curve. In this solution of the present disclosure, parallel cascading changes into serial cascading, to form another modulator structure with an adjustable transmission curve, so that the modulator structure is more diversified, and is easy to design and apply, thereby improving feasibility of this solution.

In the foregoing embodiments, the description of each embodiment has respective focuses. For a part that is not described in detail in an embodiment, reference may be made to related descriptions in other embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a read-only memory (ROM), a random access memory (RAM), a magnetic disk, or an optical disc.

The modulator, the modulation system, and the method for implementing higher order modulation provided in the present disclosure are described in detail above. The principle and implementation of the present disclosure are described herein by using specific examples. The description about the embodiments of the present disclosure is merely provided to help understand the method and core ideas of the embodiments of the present disclosure. In addition, persons skilled in the art can make variations and modifications to the present disclosure in terms of the specific implementations and application scopes according to the ideas of the present disclosure. Therefore, the content of specification shall not be construed as a limit to the present disclosure.

What is claimed is:

1. A modulator, comprising:
    a first modulation module configured to: receive first to-be-modulated data, and output a first transmission curve according to the first to-be-modulated data;
    a second modulation module configured to: receive second to-be-modulated data, and output a second transmission curve according to the second to-be-modulated data, wherein a period of the second transmission curve is half of a period of the first transmission curve; and
    a combination module configured to perform phase superposition on the first transmission curve and the second transmission curve to obtain a combined linear result.

2. The modulator according to claim 1, further comprising:
an asymmetric coupling module configured to add a preset phase shift value to the first transmission curve to obtain a shifted first transmission curve; and
wherein the combination module is configured to perform phase superposition on the shifted first transmission curve and the second transmission curve to obtain a combined linear result.

3. The modulator according to claim 1, further comprising:
a first phase shifting module configured to:
adjust phases of the first transmission curve and the second transmission curve to obtain an adjusted first transmission curve and an adjusted second transmission curve, and
wherein the combination module is configured to perform phase superposition on the adjusted first transmission curve and the adjusted second transmission curve to obtain a combined linear result; and
a first attenuation module configured to:
control a curve ratio of the adjusted first transmission curve to the adjusted second transmission curve,
pre-compensate the linear result according to the curve ratio, and
output a pre-compensated linear result.

4. The modulator according to claim 1, further comprising:
a third modulation module configured to: receive third to-be-modulated data, and output a third transmission curve according to the third to-be-modulated data, wherein a period of the third transmission curve is half of the period of the second transmission curve;
a second phase shifting module configured to:
adjust phases of the first transmission curve, the second transmission curve, and the third transmission curve, to obtain an adjusted first transmission curve, an adjusted second transmission curve, and an adjusted third transmission curve, and
wherein the combination module is configured to perform phase superposition on the adjusted first transmission curve, the adjusted second transmission curve, and the adjusted third transmission curve, to obtain a combined linear result; and
a second attenuation module configured to:
control a curve ratio of the adjusted first transmission curve, the adjusted second transmission curve, and the adjusted third transmission curve,
pre-compensate the linear result according to the curve ratio, and
output a pre-compensated linear result.

5. The modulator according to claim 3, wherein the first modulation module is connected to the first phase shifting module, and the first phase shifting module is connected to the first attenuation module by using the second modulation module.

6. A method for implementing higher order modulation, the method comprising:
receiving first to-be-modulated data, and outputting a first transmission curve according to the first to-be-modulated data;
receiving second to-be-modulated data, and outputting a second transmission curve according to the second to-be-modulated data, wherein a period of the second transmission curve is half of a period of the first transmission curve; and
performing phase superposition on the first transmission curve and the second transmission curve to obtain a combined linear result.

7. The method according to claim 6, wherein:
before performing phase superposition on the first transmission curve and the second transmission curve, the method further comprises:
adding a preset phase shift value to the first transmission curve to obtain a shifted first transmission curve; and
performing phase superposition on the first transmission curve and the second transmission curve to obtain a combined linear result comprises:
performing phase superposition on the shifted first transmission curve and the second transmission curve to obtain a combined linear result.

8. The method according to claim 6, wherein before performing phase superposition on the first transmission curve and the second transmission curve, the method further comprises:
adjusting phases of the first transmission curve and the second transmission curve to obtain an adjusted first transmission curve and an adjusted second transmission curve;
wherein performing phase superposition on the first transmission curve and the second transmission curve to obtain a combined linear result comprises:
performing phase superposition on the adjusted first transmission curve and the adjusted second transmission curve; and
controlling a curve ratio of the adjusted first transmission curve to the adjusted second transmission curve;
pre-compensating the linear result according to the curve ratio; and
outputting a pre-compensated linear result.

9. The method according to claim 6, further comprising:
receiving third to-be-modulated data, and outputting a third transmission curve according to the third to-be-modulated data, wherein a period of the third transmission curve is half of the period of the second transmission curve;
adjusting phases of the first transmission curve, the second transmission curve, and the third transmission curve to obtain an adjusted first transmission curve, an adjusted second transmission curve, and an adjusted third transmission curve;
wherein performing phase superposition on the first transmission curve and the second transmission curve comprises:
performing phase superposition on the adjusted first transmission curve, the adjusted second transmission curve, and the adjusted third transmission curve to obtain the combined linear result;
controlling a curve ratio of the adjusted first transmission curve to the adjusted second transmission curve to the adjusted third transmission curve;
pre-compensating the linear result according to the curve ratio; and
outputting a pre-compensated linear result.

10. The method according to claim 6, further comprising:
adjusting a phase of the first transmission curve to obtain an adjusted first transmission curve; and
controlling a curve ratio of the adjusted first transmission curve to the second transmission curve.

11. A modulating device, comprising:
- a first modulator configured to: receive first to-be-modulated data, and output a first transmission curve according to the first to-be-modulated data;
- a second modulator configured to: receive second to-be-modulated data, and output a second transmission curve according to the second to-be-modulated data, wherein a period of the second transmission curve is half of a period of the first transmission curve; and
- a coupler configured to perform phase superposition on the first transmission curve and the second transmission curve to obtain a combined linear result.

12. The modulator according to claim 11, further comprising:
- a first phase shifter configured to:
  - adjust phases of the first transmission curve and the second transmission curve to obtain an adjusted first transmission curve and an adjusted second transmission curve, and
  - wherein the coupler is configured to perform phase superposition on the adjusted first transmission curve and the adjusted second transmission curve to obtain a combined linear result; and
- a first attenuator configured to:
  - control a curve ratio of the adjusted first transmission curve to the adjusted second transmission curve,
  - pre-compensate the linear result according to the curve ratio, and
  - output a pre-compensated linear result.

\* \* \* \* \*